United States Patent
Peretolchin et al.

(10) Patent No.: US 11,168,273 B2
(45) Date of Patent: Nov. 9, 2021

(54) POLYCARBOXYLIC ACID-BASED ADDITIVES FOR FUELS AND LUBRICANTS

(71) Applicant: BASF SE, Ludwigshafen (DE)

(72) Inventors: Maxim Peretolchin, Lambrecht (DE); Harald Böhnke, Mannheim (DE); Wolfgang Grabarse, Mannheim (DE); Ludwig Völkel, Limburgerhof (DE); Markus Hansch, Speyer (DE); Günter Oetter, Frankenthal (DE); Aaron Flores-Figueroa, Mannheim (DE); Klaus Mühlbach, Gruenstadt (DE); Ivette Garcia Castro, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/115,500

(22) PCT Filed: Dec. 4, 2014

(86) PCT No.: PCT/EP2014/076622
§ 371 (c)(1),
(2) Date: Jul. 29, 2016

(87) PCT Pub. No.: WO2015/113681
PCT Pub. Date: Aug. 6, 2015

(65) Prior Publication Data
US 2017/0130153 A1    May 11, 2017

(30) Foreign Application Priority Data

Jan. 29, 2014 (EP) .................................. 14152991

(51) Int. Cl.
*C10L 10/04* (2006.01)
*C10L 1/196* (2006.01)
*C10L 10/06* (2006.01)
*C10L 1/14* (2006.01)
(Continued)

(52) U.S. Cl.
CPC ............... *C10L 10/04* (2013.01); *C08F 8/12* (2013.01); *C08F 8/44* (2013.01); *C10L 1/143* (2013.01);
(Continued)

(58) Field of Classification Search
CPC ............ C10L 10/04; C10L 2200/0446; C10L 2270/026; C10L 10/06; C10L 1/221; C08F 8/44
See application file for complete search history.

(56) References Cited

U.S. PATENT DOCUMENTS 3,275,554 A    9/1966 Wagenaar
3,382,056 A    5/1968 Mehmedbasich
(Continued)

FOREIGN PATENT DOCUMENTS

CA    2803207 A1 * 12/2011 ............... C08F 8/32
DE    38 26 608 A1    2/1990
(Continued)

OTHER PUBLICATIONS

Foreign Translation of WO 2011/161149 (Year: 2011).*
(Continued)

*Primary Examiner* — Ellen M Mcavoy
*Assistant Examiner* — Ming Cheung Po
(74) *Attorney, Agent, or Firm* — Grüneberg and Myers PLLC

(57) ABSTRACT

The present invention relates to the use of an olefin-carboxylic acid copolymer, wherein the copolymer comprises at least one free carboxylic acid side group, or of a nitrogen compound quaternized with epoxide in the presence of an olefin-carboxylic acid copolymer, wherein the copolymer comprises at least one free carboxylic acid side group, as a fuel additive or lubricant additive; to processes for preparing additives of this kind, and to fuels and lubricants additized
(Continued)

| step | duration (minutes) | engine speed (rpm) +/- 20 | load (%) +/- 5 | torque (Nm) +/- 5 | boost air after IC (°C) +/- 3 |
|---|---|---|---|---|---|
| 1 | 2' | 1750 | (20) | 62 | 45 |
| 2 | 7' | 3000 | (60) | 173 | 50 |
| 3 | 2' | 1750 | (20) | 62 | 45 |
| 4 | 7' | 3500 | (80) | 212 | 50 |
| 5 | 2' | 1750 | (20) | 62 | 45 |
| 6 | 10' | 4000 | 100 | * | 50 |
| 7 | 2' | 1250 | (10) | 25 | 43** |
| 8 | 7' | 3000 | 100 | * | 50 |
| 9 | 2' | 1250 | (10) | 25 | 43** |
| 10 | 10' | 2000 | 100 | * | 50 |
| 11 | 2' | 1250 | (10) | 25 | 43** |
| 12 | 7' | 4000 | 100 | * | 50 |
| | Σ= 1 hour | | | | |

* for expected range see appendix 06.5
** target only therewith; such as, more particularly, as a detergent additive; for reduction or prevention of deposits in the injection systems of direct injection diesel engines, especially in common rail injection systems, for reduction of the fuel consumption of direct injection diesel engines, especially of diesel engines with common rail injection systems, and for minimization of power loss in direct injection diesel engines, especially in diesel engines with common rail injection systems; and as an additive for gasoline fuels, especially for operation of DISI engines.

13 Claims, 1 Drawing Sheet

(51) Int. Cl.
  *C10L 10/18* (2006.01)
  *C10L 1/236* (2006.01)
  *C08F 8/12* (2006.01)
  *C08F 8/44* (2006.01)
  *C10L 1/22* (2006.01)
  *C08F 222/06* (2006.01)
  *C10L 1/224* (2006.01)

(52) U.S. Cl.
  CPC .............. *C10L 1/1966* (2013.01); *C10L 1/221* (2013.01); *C10L 1/2366* (2013.01); *C10L 10/06* (2013.01); *C10L 10/18* (2013.01); *C08F 222/06* (2013.01); *C10L 1/224* (2013.01); *C10L 2200/0209* (2013.01); *C10L 2200/0213* (2013.01); *C10L 2200/0259* (2013.01); *C10L 2200/0446* (2013.01); *C10L 2230/22* (2013.01); *C10L 2250/04* (2013.01)

(56) References Cited

U.S. PATENT DOCUMENTS

| | | |
|---|---|---|
| 3,413,104 A | 11/1968 | Mehmedbasich |
| 3,438,757 A | 4/1969 | Honnen et al. |
| 3,454,555 A | 7/1969 | Voort et al. |
| 3,565,804 A | 2/1971 | Honnen et al. |
| 3,755,433 A | 8/1973 | Miller et al. |
| 3,822,289 A | 7/1974 | Clark et al. |
| 4,171,959 A | 10/1979 | Vartanian |
| 4,248,719 A | 2/1981 | Chafetz et al. |
| 4,491,455 A | 1/1985 | Ishizaki et al. |
| 4,599,433 A | 7/1986 | Bronstert et al. |
| 4,655,948 A | 4/1987 | Metro et al. |
| 4,832,702 A | 5/1989 | Kummer et al. |
| 4,877,416 A | 10/1989 | Campbell et al. |
| 4,919,757 A | 4/1990 | Ohmae et al. |
| 4,959,077 A | 9/1990 | Martischius et al. |
| 4,980,238 A | 12/1990 | Ohmae et al. |
| 4,997,895 A | 3/1991 | Ohmae et al. |
| 5,071,919 A | 12/1991 | DeGonia et al. |
| 5,080,686 A | 1/1992 | Garrecht et al. |
| 5,229,022 A * | 7/1993 | Song .................. C08F 8/00 508/241 |
| 5,350,429 A | 9/1994 | Mohr et al. |
| 5,492,641 A | 2/1996 | Mohr et al. |
| 5,496,383 A | 3/1996 | Franz et al. |
| 5,567,845 A | 10/1996 | Franz et al. |
| 5,883,196 A | 3/1999 | Rath et al. |
| 6,743,266 B2 | 1/2004 | Derosa et al. |
| 10,377,958 B2 | 8/2019 | Mezger et al. |
| 10,844,308 B2 | 11/2020 | Mezger et al. |
| 2002/0091068 A1 | 7/2002 | Loper |
| 2004/0182743 A1 | 9/2004 | MacMillan |
| 2008/0113890 A1 | 5/2008 | Moreton et al. |
| 2016/0130514 A1 | 5/2016 | Hansch et al. |
| 2017/0183590 A1 | 6/2017 | Mezger et al. |
| 2018/0182506 A1 | 6/2018 | Gao et al. |
| 2018/0201855 A1 | 7/2018 | Garcia Castro et al. |
| 2018/0201863 A1 | 7/2018 | Mezger et al. |
| 2018/0251692 A1 | 9/2018 | Mezger et al. |
| 2019/0016987 A1 | 1/2019 | Csihony et al. |
| 2019/0218471 A1 | 7/2019 | Mezger et al. |
| 2019/0249099 A1 | 8/2019 | Peretolchin et al. |
| 2020/0056109 A1 | 2/2020 | Peretolchin et al. |
| 2020/0308486 A1 | 10/2020 | Mezger et al. |

FOREIGN PATENT DOCUMENTS

| | | | |
|---|---|---|---|
| DE | 38 38 918 A1 | 5/1990 | |
| DE | 41 42 241 A1 | 6/1993 | |
| DE | 43 09 074 A | 9/1994 | |
| DE | 43 19 672 A1 | 12/1994 | |
| DE | 43 25 237 A1 | 2/1995 | |
| DE | 196 20 262 A1 | 11/1997 | |
| DE | 101 02 913 A1 | 7/2002 | |
| DE | 102 43 361 A1 | 4/2004 | |
| EP | 0 061 895 A2 | 10/1982 | |
| EP | 0 158 310 | 10/1985 | |
| EP | 0 235 868 | 9/1987 | |
| EP | 0 244 616 A2 | 11/1987 | |
| EP | 0 261 957 A2 | 3/1988 | |
| EP | 0 299 120 A1 | 1/1989 | |
| EP | 0 307 815 A1 | 3/1989 | |
| EP | 0 310 875 A1 | 4/1989 | |
| EP | 0 315 718 A2 | 5/1989 | |
| EP | 0 356 725 A1 | 3/1990 | |
| EP | 0 452 328 A | 10/1991 | |
| EP | 0 457 599 | 11/1991 | |
| EP | 0 476 485 A1 | 3/1992 | |
| EP | 0 548 617 A2 | 6/1993 | |
| EP | 0 639 632 A1 | 2/1995 | |
| EP | 0 700 985 A1 | 3/1996 | |
| EP | 0 831 141 A1 | 3/1998 | |
| EP | 1 151 994 A1 | 11/2001 | |
| EP | 1746147 A1 * | 1/2007 | ............ C10L 1/1966 |
| EP | 2 033 945 A1 | 3/2009 | |
| GB | 2496514 A | 5/2013 | |
| JP | 55-85679 A | 6/1980 | |
| JP | 8-295891 A | 11/1996 | |
| WO | WO 87/01126 A1 | 2/1987 | |
| WO | WO 93/18115 A1 | 9/1993 | |
| WO | WO 94/24231 A1 | 10/1994 | |
| WO | WO 96/03367 A1 | 2/1996 | |
| WO | WO 96/03479 A1 | 2/1996 | |
| WO | WO 97/03946 A1 | 2/1997 | |
| WO | WO 98/04656 A1 | 2/1998 | |
| WO | WO 99/29748 A1 | 6/1999 | |
| WO | WO 00/44857 A2 | 8/2000 | |
| WO | WO 00/47698 A1 | 8/2000 | |
| WO | 2004/024850 | 3/2004 | |
| WO | WO 2004/035715 A1 | 4/2004 | |
| WO | WO 2005/054314 A2 | 6/2005 | |
| WO | WO 2006/135881 A2 | 12/2006 | |
| WO | WO 2008/060888 A2 | 5/2008 | |
| WO | WO 2008/138836 A2 | 11/2008 | |
| WO | 2010/042378 | 4/2010 | |
| WO | WO 2010/132259 A1 | 11/2010 | |
| WO | WO 2011/095819 A1 | 8/2011 | |
| WO | WO 2011/110860 A1 | 9/2011 | |
| WO | WO 2011/134923 A1 | 11/2011 | |
| WO | WO 2011/146289 A1 | 11/2011 | |
| WO | WO 2011/161149 A1 | 12/2011 | |
| WO | WO-2011161149 A1 * | 12/2011 | ................ C08F 8/32 |
| WO | WO 2012/004300 A1 | 1/2012 | |
| WO | WO 2013/000997 A1 | 1/2013 | |
| WO | WO 2013/064689 A1 | 5/2013 | |
| WO | WO 2013/070503 A1 | 5/2013 | |

OTHER PUBLICATIONS

Machine Translation of EP-1746147-A1 (Year: 2007).*
U.S. Appl. No. 14/436,951, filed Apr. 20, 2015, US 2015/0266808 A1, Markus Hansch, et al.
U.S. Appl. No. 14/896,598, filed Jul. 12, 2015, US 2016/0130514 A1, Markus Hansch, et al.

(56) References Cited

OTHER PUBLICATIONS

U.S. Appl. No. 15/678,974, filed Aug. 16, 2017, US 2017/0342340 A1, Markus Hansch, et al.
U.S. Appl. No. 15/022,681, filed Mar. 17, 2016, US 2016/0272911 A1, Markus Hansch, et al.
International Search Report dated Mar. 26, 2015 in PCT/EP2014/076622.
International Preliminary Report on Patentability and Written Opinion of the International Searching Authority dated Aug. 4, 2016 in PCT/ EP2014/076622 filed Dec. 4, 2014 (with English translation).
B. Müller, et al., "Polymeric Corrosion Inhibitors for Copper and Brass Pigments" Journal of Applied Polymer Science, vol. 80, No. 3, XP055174158, Jan. 1, 2001, pp. 475-483.
Chinese Office Action dated Nov. 16, 2017 in Chinese Patent Application No. 201480077527.2 (submitting English translation only), citing document AO therein, 8 pages.
Extended European Search Report dated Oct. 14, 2016 in European Patent Application No. 16177922.8, 4 pages.
Final Office Action dated Jan. 11, 2021, in U.S. Appl. No. 16/313,751, 20 Pages.
International Search Report dated Jul. 15, 2017 in PCT/EP2017/065751, with English translation, 5 pages.

\* cited by examiner

| step | duration (minutes) +/- 20 | engine speed (rpm) | load (%) | torque (Nm) +/-5 | boost air after IC (°C) +/-3 |
|---|---|---|---|---|---|
| 1 | 2' | 1750 | (20) | 62 | 45 |
| 2 | 7' | 3000 | (60) | 173 | 50 |
| 3 | 2' | 1750 | (20) | 62 | 45 |
| 4 | 7' | 3500 | (80) | 212 | 50 |
| 5 | 2' | 1750 | (20) | 62 | 45 |
| 6 | 10' | 4000 | 100 | * | 50 |
| 7 | 2' | 1250 | (10) | 25 | 43** |
| 8 | 7' | 3000 | 100 | * | 50 |
| 9 | 2' | 1250 | (10) | 25 | 43** |
| 10 | 10' | 2000 | 100 | * | 50 |
| 11 | 2' | 1250 | (10) | 25 | 43** |
| 12 | 7' | 4000 | 100 | * | 50 |
| | Σ = 1 hour | | | | |

\* for expected range see appendix 06.5
\*\* target only

POLYCARBOXYLIC ACID-BASED ADDITIVES FOR FUELS AND LUBRICANTS

The present invention relates to the use of an olefin-carboxylic acid copolymer, wherein the copolymer comprises at least one free carboxylic acid side group, or of a nitrogen compound quaternized with epoxide in the presence of an olefin-carboxylic acid copolymer, wherein the copolymer comprises at least one free carboxylic acid side group, as a fuel additive or lubricant additive; to processes for preparing additives of this kind, and to fuels and lubricants additized therewith; such as, more particularly, as a detergent additive; for reduction or prevention of deposits in the fuel systems and especially injection systems of direct injection diesel engines, especially in common rail injection systems, for reduction of the fuel consumption of direct injection diesel engines, especially of diesel engines with common rail injection systems, and for minimization of power loss in direct injection diesel engines, especially in diesel engines with common rail injection systems; and as an additive for gasoline fuels, especially for operation of DISI engines.

BACKGROUND OF THE INVENTION

In direct injection diesel engines, the fuel is injected and distributed ultrafinely (nebulized) by a multihole injection nozzle which reaches directly into the combustion chamber of the engine, instead of being introduced into a prechamber or swirl chamber as in the case of the conventional (chamber) diesel engine. The advantage of direct injection diesel engines lies in their high performance for diesel engines and nevertheless low fuel consumption. Moreover, these engines achieve a very high torque even at low speeds.

At present, essentially three methods are being used for injection of the fuel directly into the combustion chamber of the diesel engine: the conventional distributor injection pump, the pump-nozzle system (unit-injector system or unit-pump system), and the common rail system.

In the common rail system, the diesel fuel is conveyed by a pump with pressures up to 2000 bar into a high-pressure line, the common rail. Proceeding from the common rail, branch lines run to the different injectors which inject the fuel directly into the combustion chamber. The full pressure is always applied to the common rail, which enables multiple injection or a specific injection form. In the other injection systems, in contrast, only a smaller variation in the injection is possible. Injection in the common rail is divided essentially into three groups: (1.) pre-injection, by which essentially softer combustion is achieved, such that harsh combustion noises ("nailing") are reduced and the engine seems to run quietly; (2.) main injection, which is responsible especially for a good torque profile; and (3.) post-injection, which especially ensures a low $NO_x$ value. In this post-injection, the fuel is generally not combusted, but instead vaporized by residual heat in the cylinder. The exhaust gas/fuel mixture formed is transported to the exhaust gas system, where the fuel, in the presence of suitable catalysts, acts as a reducing agent for the nitrogen oxides $NO_x$.

The variable, cylinder-individual injection in the common rail injection system can positively influence the pollutant emission of the engine, for example the emission of nitrogen oxides ($NO_x$), carbon monoxide (CO) and especially of particulates (soot). This makes it possible, for example, for engines equipped with common rail injection systems to meet the Euro 4 standard theoretically even without additional particulate filters.

In modern common rail diesel engines, under particular conditions, for example when biodiesel-containing fuels or fuels with metal impurities such as zinc compounds, copper compounds, lead compounds and other metal compounds are used, deposits can form on the injector orifices, which adversely affect the injection performance of the fuel and hence impair the performance of the engine, i.e. especially reduce the power, but in some cases also worsen the combustion. The formation of deposits is enhanced further by further developments in the injector construction, especially by the change in the geometry of the nozzles (narrower, conical orifices with rounded outlet). For lasting optimal functioning of engine and injectors, such deposits in the nozzle orifices must be prevented or reduced by suitable fuel additives.

In the injection systems of modern diesel engines, deposits cause significant performance problems. It is common knowledge that such deposits in the spray channels can lead to a decrease in the fuel flow and hence to power loss. Deposits at the injector tip, in contrast, impair the optimal formation of fuel spray mist and, as a result, cause worsened combustion and associated higher emissions and increased fuel consumption. In contrast to these conventional "external" deposition phenomena, "internal" deposits (referred to collectively as internal diesel injector deposits (IDID)) in particular parts of the injectors, such as at the nozzle needle, at the control piston, at the valve piston, at the valve seat, in the control unit and in the guides of these components, also increasingly cause performance problems. Conventional additives exhibit inadequate action against these IDIDs.

U.S. Pat. No. 4,248,719 describes quaternized ammonium salts which are prepared by reacting an alkenylsuccinimide with a monocarboxylic ester and find use as dispersants in lubricant oils for prevention of sludge formation. More particularly, for example, the reaction of polyisobutylsuccinic anhydride (PIBSA) with N,N-dimethylaminopropylamine (DMAPA) and quaternization with methyl salicylate is described. However, use in fuels, more particularly diesel fuels, is not proposed therein. The use of PIBSA with low bismaleation levels of <20% is not described therein.

U.S. Pat. No. 4,171,959 describes quaternized ammonium salts of hydrocarbyl-substituted succinimides, which are suitable as detergent additives for gasoline fuel compositions. Quaternization is preferably accomplished using alkyl halides. Also mentioned are organic $C_2$-$C_8$-hydrocarbyl carboxylates and sulfonates. Consequently, the quaternized ammonium salts provided according to the teaching therein have, as a counterion, either a halide or a $C_2$-$C_8$-hydrocarbyl carboxylate or a $C_2$-$C_8$-hydrocarbyl sulfonate group. The use of PIBSA with low bismaleation levels of <20% is likewise not described therein.

EP-A-2 033 945 discloses cold flow improvers which are prepared by quaternizing specific tertiary monoamines bearing at least one $C_8$-$C_{40}$-alkyl radical with a $C_1$-$C_4$-alkyl ester of specific carboxylic acids. Examples of such carboxylic esters are dimethyl oxalate, dimethyl maleate, dimethyl phthalate and dimethyl fumarate. Uses other than that for improvement of the CFPP value of middle distillates are not demonstrated in EP-A-2 033 945.

WO 2006/135881 describes quaternized ammonium salts prepared by condensation of a hydrocarbyl-substituted acylating agent and of an oxygen or nitrogen atom-containing compound with a tertiary amino group, and subsequent quaternization by means of hydrocarbyl epoxide in the presence of stoichiometric amounts of an acid such as, more particularly, acetic acid. Further quaternizing agents claimed in WO 2006/135881 are dialkyl sulfates, benzyl halides and hydrocarbyl-substituted carbonates, and dimethyl sulfate, benzyl chloride and dimethyl carbonate have been studied experimentally.

WO 2011/146289 describes nitrogen-free additives formed from a substituted hydrocarbon having at least two carboxyl groups in free form or in anhydride form for improving detergency in fuel systems. Examples disclosed include hydrocarbyl-substituted succinic anhydrides and hydrolyzed forms thereof.

It is an object of the present invention to provide a novel class of carboxylic acid-based additives for use in modern diesel fuels and gasoline fuels.

SUMMARY OF THE INVENTION

The above object has surprisingly been achieved by the olefin-carboxylic acid copolymers of the type described herein. These have the particular feature that they act against a wide variety of different deposits which impair the performance of modern diesel engines. The inventive compounds act, for example, against power loss both caused by introduction of zinc and caused by introduction of sodium into the diesel fuel. In doing so, deposits in the spray channels and the injector tip are essentially eliminated or avoided. On the other hand, the inventive compounds also act against internal diesel injector deposits (IDIDs).

DETAILED DESCRIPTION OF THE INVENTION

A1) Specific Embodiments

Figures 1A, 1B:
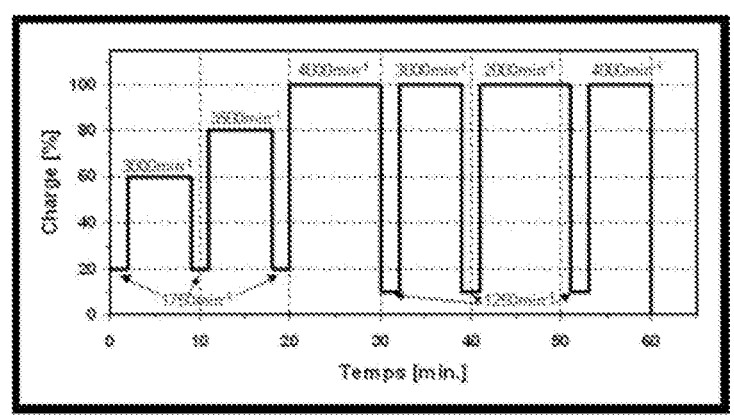
FIG. 1A shows a table corresponding to the running of a one-hour engine test cycle according to CEC F-098-08.
FIG. 1B shows a graph corresponding to the running of a one-hour engine test cycle according to CEC F-098-08.

Specific embodiments of the invention are:
1. The use (a) of an olefin-polymerizable carboxylic acid copolymer (i.e. copolymer formed from at least one olefin and at least one polymerizable carboxylic acid), wherein the copolymer comprises at least one free carboxylic acid side group, or (b) of a nitrogen compound quaternized with epoxide in the presence of an olefin-polymerizable carboxylic acid copolymer, wherein the copolymer comprises at least one free carboxylic acid side group, as a fuel additive or lubricant additive, especially diesel additive; especially wherein the polymerizable carboxylic acid is a polymerizable mono- or polycarboxylic acid, especially monocarboxylic acid or dicarboxylic acid, such as $C_4$-$C_8$-dicarboxylic acids, for example acrylic acid, methacrylic acid or maleic acid; and/or wherein the olefin is especially an α-olefin, for example a $C_4$-$C_{40}$- or $C_{18}$-$C_{26}$, or $C_{18}$-$C_{22}$- or $C_{20}$-$C_{24}$-α-olefin.
2. The use of a copolymer, of a copolymer-containing reaction product or of a copolymer-containing component fraction thereof, wherein the copolymer is obtainable by
   (1) copolymerizing
      a) at least one ethylenically unsaturated, polymerizable polycarboxylic anhydride, especially $C_4$-$C_8$-dicarboxylic anhydride, for example maleic anhydride, with
      b) at least one polymerizable olefin, especially α-olefin, for example a $C_4$-$C_{40}$- or $C_{18}$-$C_{26}$-, or $C_{18}$-$C_{22}$- or $C_{20}$-$C_{24}$-α-olefin;
   (2) then derivatizing the copolymer from step (1) by partial or complete reaction of the anhydride radicals of the copolymer from step (1) with water, or at least one hydroxyl compound, or at least one primary or secondary amine, or mixtures thereof, especially water; to form a copolymer derivative containing carboxyl groups; and optionally
   (3) quaternizing a quaternizable (especially tertiary) nitrogen compound with an epoxide and the copolymer derivative from step (2); as a fuel additive or lubricant additive; especially diesel fuel additive.

In a specific embodiment, the invention relates to the use of a copolymer, a copolymer-containing reaction product or a copolymer-containing fraction thereof, wherein the copolymer is obtainable by
   (1) copolymerization of
      a) at least one ethylenically unsaturated, polymerizable $C_4$-$C_8$-dicarboxylic anhydride, especially maleic anhydride, with
      b) at least one polymerizable $C_{18}$-$C_{26}$-α-olefin, such as especially a $C_{18}$-$C_{22}$-, $C_{20}$-$C_{24}$- or especially $C_{20}$-α-olefin;
   (2) subsequent derivatization of the copolymer from step (1) by partial or complete reaction of the anhydride radicals of the copolymer from step (1) with water to form a copolymer derivative containing carboxyl groups.
3. The use of a copolymer, of a copolymer-containing reaction product or of a copolymer-containing component fraction thereof, wherein the copolymer is obtainable by
   (1) copolymerizing
      a) at least one ethylenically unsaturated, polymerizable mono- or polycarboxylic acid, especially monocarboxylic acid or dicarboxylic acid, for example $C_4$-$C_8$-dicarboxylic acids, for example acrylic acid, methacrylic acid or maleic acid, with
      b) at least one polymerizable olefin, especially α-olefin, for example a $C_4$-$C_{40}$- or $C_{18}$-$C_{26}$- or $C_{18}$-$C_{22}$- or $C_{20}$-$C_{24}$-α-olefin;
   (2) then derivatizing the copolymer from step (1) by partial reaction of the carboxyl radicals of the copolymer with at least one hydroxyl compound, at least one primary or secondary amine; or mixtures thereof, to form a copolymer derivative having a reduced content of free carboxyl groups; and optionally
   (3) quaternizing a quaternizable nitrogen compound with an epoxide and the copolymer derivative from step (2); as a fuel additive or lubricant additive; especially diesel fuel additive.
4. The use of a copolymer, of a copolymer-containing reaction product or of a copolymer-containing component fraction thereof, wherein the copolymer is obtainable by
   (1) copolymerizing
      a) at least one ethylenically unsaturated, polymerizable mono- or polycarboxylic acid, especially monocarboxylic acid or dicarboxylic acid, for example $C_4$-$C_8$-dicarboxylic acid, for example acrylic acid or maleic acid, with
      b) at least one polymerizable olefin, especially α-olefin, for example a $C_4$-$C_{40}$- or $C_{18}$-$C_{26}$-, $C_{18}$-$C_{22}$- or $C_{20}$-$C_{24}$-α-olefin; and optionally
   (2) quaternizing a quaternizable nitrogen compound with an epoxide and the hydrolysis product from step (1);

as a fuel additive or lubricant additive; especially diesel fuel additive.
5. The use according to any of embodiments 1 to 4 as an additive for reducing the fuel consumption of direct injection diesel engines, especially of diesel engines with common rail injection systems.
6. The use according to any of the embodiments as an additive for minimizing power loss in direct injection diesel engines, especially in diesel engines with common rail injection systems.
7. The use according to embodiment 6 as an additive for minimizing power loss caused by K, Zn, Ca and/or Na ions (called K, Zn, Ca or Na power loss).
8. The use according to any of the embodiments as a gasoline fuel additive for reducing the level of deposits in the intake system of a gasoline engine, such as, more particularly, DISI and PFI (port fuel injector) engines.
9. The use according to any of the embodiments as a diesel fuel additive for reducing and/or preventing deposits in the fuel systems, especially injection systems, such as especially the internal diesel injector deposits (IDIDs), and/or for reducing and/or preventing valve sticking in direct injection diesel engines, especially in common rail injection systems.
   The particular basis of uses of the present invention is thus that the inventive compounds act against deposits not just in the injection system, but also in the rest of the fuel system, here especially against deposits in fuel filters and pumps.
10. The use according to embodiment 9 as a diesel fuel additive for reducing and/or preventing the internal diesel injector deposits (IDIDs) caused by Na, Ca and/or K ions (called Na, Ca or K soap IDIDs).
11. The use according to embodiment 10 as a diesel fuel additive for reducing and/or preventing the internal diesel injector deposits (IDIDs) caused by polymer deposits.
12. The use according to any of the preceding embodiments, wherein the carboxylic acid is an ethylenically unsaturated polycarboxylic anhydride and especially the anhydride of an ethylenically unsaturated $C_4$-$C_{40}$- or especially $C_4$-$C_8$-dicarboxylic acid, such as maleic acid.
13. The use according to embodiment 11, wherein the ethylenically unsaturated polycarboxylic anhydride is maleic anhydride.
14. The use according to any of the preceding embodiments, wherein the polymerizable olefin is a $C_4$-$C_{40}$- or $C_{18}$-$C_{26}$-, $C_{18}$-$C_{22}$- or $C_{20}$-$C_{24}$- or especially $C_{20}$-α-olefin.
15. The use according to any of the preceding embodiments, wherein the polymerizable olefin is a polymer formed from $C_2$-$C_{40}$-, especially $C_2$-$C_{12}$-α-olefin units having at least one polymerizable double bond and having an Mw in the range from 56 to 10 000.
16. The use according to any of the preceding embodiments, wherein the ethylenically unsaturated carboxylic acid is an ethylenically unsaturated $C_3$-$C_{40}$-carboxylic acid, especially $C_3$-$C_{40}$- or $C_3$-$C_{20}$- or $C_3$-$C_{10}$- or $C_3$-$C_4$-monocarboxylic acid, or a derivative thereof.
17. The use according to embodiment 15, wherein the ethylenically unsaturated carboxylic acid is acrylic acid or methacrylic acid.
18. The use according to any of the preceding embodiments, wherein the quaternizable nitrogen compound, for example a quaternizable alkylamine, has at least one quaternizable, tertiary amino group.
19. The use according to any of the preceding embodiments, wherein the epoxide is a hydrocarbyl epoxide.
20. The use according to any of the preceding embodiments, wherein the epoxide comprises an epoxide of the general formula 4

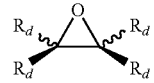

(4)

where
the $R_d$ radicals present therein are the same or different and are each H or a hydrocarbyl radical, the hydrocarbyl radical being an aliphatic or aromatic radical having 1 to 20, especially 1 to 16 or 1 to 10 or 1 to 4, carbon atoms, for example propylene oxide.
21. The use according to any of the preceding embodiments, wherein the copolymer has a molecular weight $M_w$ in the range from 400 to 50 000, especially 800 to 10 000 g/mol.
22. The use according to any of the preceding embodiments, wherein the quaternizable nitrogen compound comprises a quaternizable amine of the following general formula 3

$R_a R_b R_c N$ (3)

in which
at least one of the $R_a$, $R_b$ and $R_c$ radicals is a straight-chain or branched, saturated or unsaturated $C_8$-$C_{40}$- or $C_{10}$-$C_{20}$-hydrocarbyl radical, especially straight-chain or branched $C_8$-$C_{40}$- or $C_{10}$-$C_{20}$-alkyl, and the other radicals are identical or different, straight-chain or branched, saturated or unsaturated $C_1$-$C_6$-hydrocarbyl radicals, especially $C_1$-$C_6$-alkyl, for example N,N-dimethyl-N—$C_{12/14}$-amine; or
in which all the $R_a$, $R_b$ and $R_c$ radicals are identical or different, straight-chain or branched, saturated or unsaturated $C_8$-$C_{40}$- or $C_{10}$-$C_{20}$-hydrocarbyl radicals, especially straight-chain or branched $C_8$-$C_{40}$- or $C_{10}$-$C_{20}$-alkyl radicals.
23. The use according to any of the preceding embodiments, wherein the quaternizable nitrogen compound is a compound of the formula 3 in which two of the $R_a$, $R_b$ and $R_c$ radicals are the same or different and are each $C_1$-$C_4$-alkyl and the other radical is a straight-chain or branched $C_{10}$-$C_{20}$-alkyl.
24. The use according to any of the preceding embodiments, wherein the fuel is selected from diesel fuels, biodiesel fuels, gasoline fuels, and alkanol-containing gasoline fuels.
25. A copolymer product (especially copolymer or copolymer-containing quaternization product) as defined in any of embodiments 1 to 22.
26. A process for preparing a copolymer according to embodiment 24, comprising the
   (1) copolymerization of the monomer components
   (2) optionally subsequent partial or complete reaction of the copolymer from step (1) with water, at least one hydroxyl compound, at least one primary or secondary amine; or mixtures thereof; and/or optionally
   (3) quaternization of a quaternizable nitrogen compound with an epoxide and the hydrolysis product from step (2); or with an epoxide and the copolymer from step (1).
27. An additive concentrate comprising, in combination with further diesel fuel additives or gasoline fuel additives or lubricant additives, at least one copolymer, a copolymer-containing reaction product, or a copolymer-containing component fraction thereof as defined in any of embodiments 1 to 22 or prepared according to embodiment 25.

28. A fuel composition, lubricant composition or diesel composition, especially diesel fuel composition, comprising a copolymer, a copolymer-containing reaction product, or a copolymer-containing component fraction thereof as defined in any of embodiments 1 to 22 or prepared according to embodiment 25.

A2) General Definitions

In the absence of statements to the contrary, the following general definitions apply:

The "injection system" is understood to mean the part of the fuel system in motor vehicles from the fuel pump up to and including the injector outlet.

"Fuel system" is understood to mean the components of motor vehicles which are in contact with the particular fuel, preferably the region from the tank up to and including the injector outlet.

"Internal diesel injector deposits (IDIDs)" are especially deposits caused by Na, Ca and/or K ions (called Na, Ca and K soap IDIDs respectively) and/or polymeric deposits. Na, Ca and K soap IDIDs are deposits comprising the relevant metal ions with any counterions. The polymeric deposits, in contrast, are free of metal ions and derive from high molecular weight organic material of low or zero solubility in the fuel.

A "free carboxylic acid side group" in the context of the invention comprises at least one carboxyl group of the formula —COOH which may either be in protonated form or in salt form (e.g. alkali metal salt), or in the form of a derivative, for example as part of an anhydride group or as an ester, for example lower alkyl ester.

A "polymerizable carboxylic acid" represents polymerizable mono- or polycarboxylic acids which have at least one, especially one, polymerizable group, especially C=C group, and are especially ethylenically unsaturated. More particularly, these are monounsaturated mono- or polycarboxylic acids, especially monounsaturated mono- or dicarboxylic acids. Likewise encompassed are the derivatives, especially esters and anhydrides, thereof. Esters are especially the lower alkyl esters.

"Quaternizable" nitrogen groups or amino groups comprise especially primary, secondary and, in particular, tertiary amino groups.

"Hydrocarbyl" should be interpreted broadly and comprises both long-chain and short-chain, straight-chain and branched hydrocarbyl radicals having 1 to 50 carbon atoms, which may optionally additionally comprise heteroatoms, for example O, N, NH, S, in the chain thereof. A specific group of hydrocarbyl radicals comprises both long-chain and short-chain, straight-chain or branched alkyl radicals having 1 to 1000, 3 to 500, 4 to 400 carbon atoms.

"Long-chain" or "high molecular weight" hydrocarbyl radicals are straight-chain or branched hydrocarbyl radicals and have 7 to 50 or 8 to 50 or 8 to 40 or 10 to 20 carbon atoms, which may optionally additionally comprise heteroatoms, for example O, N, NH, S, in the chain thereof. In addition, the radicals may be mono- or polyunsaturated and have one or more noncumulated, for example 1 to 5, such as 1, 2 or 3, C—C double bonds or C—C triple bonds, especially 1, 2 or 3 double bonds. They may be of natural or synthetic origin.

They may also have a number-average molecular weight ($M_n$) of 85 to 20 000, for example 113 to 10 000, or 200 to 10 000 or 350 to 5000, for example 350 to 3000, 500 to 2500, 700 to 2500, or 800 to 1500. In that case, they are more particularly formed essentially from $C_{2-6}$, especially $C_{2-4}$, monomer units such as ethylene, propylene, n- or isobutylene or mixtures thereof, where the different monomers may be copolymerized in random distribution or as blocks. Such long-chain hydrocarbyl radicals are also referred to as polyalkylene radicals or poly-$C_{2-6}$- or poly-$C_{2-4}$-alkylene radicals. Suitable long-chain hydrocarbyl radicals and the preparation thereof are also described, for example, in WO 2006/135881 and the literature cited therein.

Examples of particularly useful polyalkylene radicals are polyisobutenyl radicals derived from what are called "high-reactivity" polyisobutenes which feature a high content of terminal double bonds. Terminal double bonds are alpha-olefinic double bonds of the type

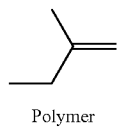

Polymer which are also referred to collectively as vinylidene double bonds. Suitable high-reactivity polyisobutenes are, for example, polyisobutenes which have a proportion of vinylidene double bonds of greater than 70 mol %, especially greater than 80 mol % or greater than 85 mol %. Preference is given especially to polyisobutenes which have homogeneous polymer skeletons. Homogeneous polymer skeletons are possessed especially by those polyisobutenes formed from isobutene units to an extent of at least 85% by weight, preferably to an extent of at least 90% by weight and more preferably to an extent of at least 95% by weight. Such high-reactivity polyisobutenes preferably have a number-average molecular weight within the abovementioned range. In addition, the high-reactivity polyisobutenes may have a polydispersity in the range from 1.05 to 7, especially of about 1.1 to 2.5, for example of less than 1.9 or less than 1.5. Polydispersity is understood to mean the quotient of weight-average molecular weight Mw divided by the number-average molecular weight Mn.

Particularly suitable high-reactivity polyisobutenes are, for example, the Glissopal brands from BASF SE, especially Glissopal@ 1000 (Mn=1000), Glissopal@ V 33 (Mn=550), and Glissopal@ 2300 (Mn=2300), and mixtures thereof. Other number-average molecular weights can be established in a manner known in principle by mixing polyisobutenes of different number-average molecular weights or by extractive enrichment of polyisobutenes of particular molecular weight ranges.

A specific group of long-chain hydrocarbyl radicals comprises straight-chain or branched alkyl radicals ("long-chain alkyl radicals") having 8 to 50, for example 8 to 40 or 8 to 30 or 10 to 20, carbon atoms.

A further group of specific long-chain hydrocarbyl radicals comprises polyalkylene radicals which are especially formed essentially from $C_{2-6}$, especially $C_{2-4}$, monomer units, such as ethylene, propylene, n- or isobutylene or mixtures thereof and have a degree of polymerization of 2 to 100, or 3 to 50 or 4 to 25.

"Short-chain hydrocarbyl" or "low molecular weight hydrocarbyl" is especially straight-chain or branched alkyl or alkenyl, optionally interrupted by one or more, for example 2, 3 or 4, heteroatom groups such as —O— or —NH—, or optionally mono- or polysubstituted, for example di-, tri- or tetrasubstituted.

"Hydrocarbylene" represents straight-chain or singly or multiply branched bridge groups having 1 to 10 carbon atoms, optionally interrupted by one or more, for example 2, 3 or 4, heteroatom groups such as —O— or —NH—, or optionally mono- or polysubstituted, for example di-, tri- or tetrasubstituted.

"Alkyl" or "lower alkyl" represents especially saturated, straight-chain or branched hydrocarbon radicals having 1 to 4, 1 to 5, 1 to 6, or 1 to 7, carbon atoms, for example methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl; and also n-heptyl, and the singly or multiply branched analogs thereof.

"Long-chain alkyl" represents, for example, saturated straight-chain or branched hydrocarbyl radicals having 8 to 50, for example 8 to 40 or 8 to 30 or 10 to 20, carbon atoms, such as octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, squalyl, constitutional isomers, especially singly or multiply branched isomers and higher homologs thereof.

"Hydroxyalkyl" represents especially the mono- or polyhydroxylated, especially monohydroxylated, analogs of the above alkyl radicals, for example the monohydroxylated analogs of the above straight-chain or branched alkyl radicals, for example the linear hydroxyalkyl groups, for example those having a primary (terminal) hydroxyl group, such as hydroxymethyl, 2-hydroxyethyl, 3-hydroxypropyl, 4-hydroxybutyl, or those having nonterminal hydroxyl groups, such as 1-hydroxyethyl, 1- or 2-hydroxypropyl, 1- or 2-hydroxybutyl or 1-, 2- or 3-hydroxybutyl.

"Alkenyl" represents mono- or polyunsaturated, especially monounsaturated, straight-chain or branched hydrocarbyl radicals having 2 to 4, 2 to 6, or 2 to 7 carbon atoms and one double bond in any position, e.g. $C_2$-$C_6$-alkenyl such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl.

"Hydroxyalkenyl" represents especially the mono- or polyhydroxylated, especially monohydroxylated, analogs of the above alkenyl radicals.

"Aminoalkyl" and "aminoalkenyl" represent especially the mono- or polyaminated, especially monoaminated, analogs of the above alkyl and alkenyl radicals respectively, or analogs of the above hydroxyalkyl where the OH group has been replaced by an amino group.

"Alkylene" represents straight-chain or singly or multiply branched hydrocarbyl bridging groups having 1 to 10 carbon atoms, for example $C_1$-$C_7$-alkylene groups selected from —CH$_2$—, —(CH$_2$)$_2$—, —(CH$_2$)$_3$—, —(CH$_2$)$_4$—, —(CH$_2$)$_2$—CH(CH$_3$)—, —CH$_2$—CH(CH$_3$)—CH$_2$—, (CH$_2$)$_4$—, —(CH$_2$)$_5$—, —(CH$_2$)$_6$—, —(CH$_2$)$_7$—, —CH(CH$_3$)—CH$_2$—CH$_2$—CH(CH$_3$)— or —CH(CH$_3$)—CH$_2$—CH$_2$—CH$_2$—CH(CH$_3$)— or $C_1$-$C_4$-alkylene groups selected from —CH$_2$—, —(CH$_2$)$_2$—, —(CH$_2$)$_3$—, —(CH$_2$)$_4$—, —(CH$_2$)$_2$—CH(CH$_3$)—, —CH$_2$—CH(CH$_3$)—CH$_2$— or $C_2$-$C_6$-alkylene groups, for example —CH$_2$—CH(CH$_3$)—, —CH(CH$_3$)—CH$_2$—, —CH(CH$_3$)—CH(CH$_3$)—, —C(CH$_3$)$_2$—CH$_2$—, —CH$_2$—C(CH$_3$)$_2$—, —C(CH$_3$)$_2$—CH(CH$_3$)—, —CH(CH$_3$)—C(CH$_3$)$_2$—, —CH$_2$—CH(Et)-, —CH(CH$_2$CH$_3$)—CH$_2$—, —CH(CH$_2$CH$_3$)—CH(CH$_2$CH$_3$)—, —C(CH$_2$CH$_3$)$_2$—CH$_2$—, —CH$_2$—C(CH$_2$CH$_3$)$_2$—, —CH$_2$—CH(n-propyl)-, —CH(n-propyl)-CH$_2$—, —CH(n-propyl)-CH(CH$_3$)—, —CH$_2$—CH(n-butyl)-, —CH(n-butyl)-CH$_2$—, —CH(CH$_3$)—CH(CH$_2$CH$_3$)—, —CH(CH$_3$)—CH(n-propyl)-, —CH(CH$_2$CH$_3$)—CH(CH$_3$)—, —CH(CH$_3$)—CH(CH$_2$CH$_3$)—, or $C_2$-$C_4$-alkylene groups, for example selected from —(CH$_2$)$_2$—, —CH$_2$—CH(CH$_3$)—, —CH(CH$_3$)—CH$_2$—, —CH(CH$_3$)—CH(CH$_3$)—, —C(CH$_3$)$_2$—CH$_2$—, —CH$_2$—C(CH$_3$)$_2$—, —CH$_2$—CH(CH$_2$CH$_3$)—, —CH(CH$_2$CH$_3$)—CH$_2$—.

Oxyalkylene radicals correspond to the definition of the above straight-chain or singly or multiply branched alkylene radicals having 2 to 10 carbon atoms, where the carbon chain may be interrupted once or more than once, especially once, by an oxygen heteroatom. Nonlimiting examples include: —CH$_2$—O—CH$_2$—, —(CH$_2$)$_2$—O—(CH$_2$)$_2$—, —(CH$_2$)$_3$—O—(CH$_2$)$_3$—, or —CH$_2$—O—(CH$_2$)$_2$—, —(CH$_2$)$_2$—O—(CH$_2$)$_3$—, —CH$_2$—O—(CH$_2$)$_3$ Aminoalkylene corresponds to the definition of the above straight-chain or singly or multiply branched alkylene radicals having 2 to 10 carbon atoms, where the carbon chain may be interrupted once or more than once, especially once, by a nitrogen group (especially —NH— group). Nonlimiting examples include: —CH$_2$—NH—CH$_2$—, —(CH$_2$)$_2$—NH—(CH$_2$)$_2$—, —(CH$_2$)$_3$—NH—(CH$_2$)$_3$—, or —CH$_2$—NH—(CH$_2$)$_2$—, —(CH$_2$)$_2$—NH—(CH$_2$)$_3$—, —CH$_2$—NH—(CH$_2$)$_3$.

"Alkenylene" represents the mono- or polyunsaturated, especially monounsaturated, analogs of the above alkylene groups having 2 to 10 carbon atoms, especially $C_2$-$C_7$-alkenylenes or $C_2$-$C_4$-alkenylene, such as —CH=CH—, —CH=CH—CH$_2$—, —CH$_2$—CH=CH—, —CH=CH—CH$_2$—CH$_2$—, —CH$_2$—CH=CH—CH$_2$—, —CH$_2$—CH$_2$—CH=CH—, —CH(CH$_3$)—CH=CH—, —CH$_2$—C(CH$_3$)=CH—.

"Cycloalkyl" represents carbocyclic radicals having 3 to 20 carbon atoms, for example $C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given cyclopentyl, cyclohexyl, cycloheptyl, and also to cyclopropylmethyl, cyclopropylethyl, cyclobutylmethyl, cyclobutylethyl, cyclopentylmethyl, cyclopentylethyl, cyclohexylmethyl, or $C_3$-$C_7$-cycloalkyl such as cyclopropyl, cyclobutyl, cyclopentyl, cyclohexyl, cycloheptyl, cyclopropylmethyl, cyclopropylethyl, cyclobutylmethyl, cyclopentylethyl, cyclohexylmethyl, where the bond to the rest of the molecule may be via any suitable carbon atom.

"Cycloalkenyl" or mono- or polyunsaturated cycloalkyl represents especially monocyclic, mono- or polyunsaturated hydrocarbyl groups having 5 to 8, preferably to 6, carbon ring members, for example the monounsaturated radicals cyclopenten-1-yl, cyclopenten-3-yl, cyclohexen-1-yl, cyclohexen-3-yl and cyclohexen-4-yl.

"Aryl" represents mono- or polycyclic, preferably mono- or bicyclic, optionally substituted aromatic radicals having 6 to 20, for example 6 to 10, ring carbon atoms, for example phenyl, biphenyl, naphthyl such as 1- or 2-naphthyl, tetrahydronaphthyl, fluorenyl, indenyl and phenanthrenyl. These aryl radicals may optionally bear 1, 2, 3, 4, 5 or 6 identical or different substituents.

"Alkylaryl" represents analogs of the above aryl radicals mono- or polyalkyl-substituted, especially mono- or dialkyl-substituted, in any ring position, where aryl is likewise as defined above, for example $C_1$-$C_4$-alkylphenyl, where the $C_1$-$C_4$-alkyl radicals may be in any ring position.

"Substituents" for radicals specified herein are especially, unless stated otherwise, selected from keto groups, —COOH, —COO-alkyl, —OH, —SH, —CN, amino, —NO$_2$, alkyl, or alkenyl groups.

"Mn" represents the number-average molecular weight and is determined in a conventional manner; more particularly, such figures relate to Mn values determined by relative methods, such as gel permeation chromatography with THF as the eluent and polystyrene standards, or absolute methods, such as vapor phase osmometry using toluene as the solvent.

"Mw" represents the weight-average molecular weight and is determined in a conventional manner; more particularly, such figures relate to Mw values determined by relative methods, such as gel permeation chromatography with THF as the eluent and polystyrene standards, or absolute methods, such as light scattering.

The "degree of polymerization" usually refers to the numerical mean degree of polymerization (determination method: gel permeation chromatography with THF as the eluent and polystyrene standards; or GC-MS coupling).

A3) Olefin-Carboxylic Acid Copolymers

The copolymers used in accordance with the invention for quaternization of nitrogen compounds are obtainable in a manner known per se from monomer units known per se, namely polymerizable olefin (m1) and polymerizable carboxylic acid (m2). The copolymer may take the form of a random copolymer, an alternating copolymer or else of a block copolymer.

In one embodiment of the present invention, copolymer has a mean molecular weight $M_w$ in the range from 800 to 50 000, 900 to 10 000, 1000 to 5000 or preferably 1000 to 3000 g/mol, determined, for example, by gel permeation chromatography of the unhydrolyzed copolymer in THF (tetrahydrofuran) with polystyrene calibration.

Olefin Unit (m1):

For example, the polymerizable olefin may be a $C_4$-$C_{40}$-α-olefin, preferably $C_6$-$C_{36}$-α-olefin, more preferably $C_8$-$C_{32}$-α-olefin, even more preferably $C_{10}$-$C_{28}$-α-olefin, particularly $C_{12}$-$C_{26}$-α-olefin and especially $C_{16}$-$C_{24}$-, particularly $C_{18}$-$C_{22}$-α-olefin, for example a $C_{20}$-α-olefin.

In another embodiment, the polymerizable olefin may be a polymer formed from $C_2$-$C_{12}$-olefin units, preferably comprising $C_2$-$C_{12}$-α-olefin units, more preferably consisting of $C_2$-$C_{12}$-α-olefin units having at least one polymerizable double bond and having an Mw in the range from 56 to 10 000.

These are namely oligomers and polymers of propene, 1-butene, 2-butene, isobutene and mixtures thereof, particularly oligomers and polymers of propene or isobutene or of mixtures of 1-butene and 2-butene. Among the oligomers, preference is given to the trimers, tetramers, pentamers and hexamers, and mixtures thereof.

Nonlimiting examples of $C_2$-$C_{40}$-α-olefins are ethylene, propylene, singly or multiply branched or unbranched forms of α-$C_4H_8$, α-$C_5H_{10}$, α-$C_6H_{12}$, α-$C_7H_{14}$, α-$C_8H_{16}$, α-$C_9H_{18}$, α-$C_{10}H_{20}$, α-$C_{12}H_{24}$, α-$C_{14}H_{28}$, α-$C_{16}H_{32}$, α-$C_{18}H_{36}$, α-$C_{20}H_{40}$, α-$C_{22}H_{44}$, α-$C_{24}H_{48}$, α-$C_{30}H_{60}$, α-$C_{40}H_{80}$, α-diisobutene, α-triisobutene, α-tetraisobutene, dimer propene, trimer propene and tetramer propene; and polyisobutenes having at least one polymerizable C═C bond, having a mean molecular weight $M_w$ in the range from 250 to 5000 g/mol.

The copolymer may comprise one, two or more different monomers m1, but preferably only one or two different monomers and more preferably one monomer.

If, in a preferred embodiment, the monomer m1 consists of two olefins (olefin 1 and olefin 2), olefin 1 is selected from the group consisting of $C_4$-$C_{40}$-α-olefins, preferably $C_6$-$C_{36}$-α-olefins, more preferably $C_8$-$C_{32}$-α-olefins, even more preferably $C_{10}$-$C_{28}$-α-olefins, particularly $C_{12}$-$C_{26}$-α-olefins and especially $C_{16}$-$C_{24}$-α-olefins, and in particular $C_{18}$-$C_{22}$-α-olefins, for example $C_{20}$-α-olefin.

At the same time, olefin 2 is an oligomer or polymer comprising 1-butene, 2-butene and/or isobutene, preferably isobutene, in copolymerized form, preferably trimers, tetramers, pentamers, hexamers or polymers having a mean molecular weight $M_w$ in the range from 250 to 5000 g/mol, preferably 350 to 3000, more preferably 500 to 1500 g/mol, of isobutene.

Preferably, the oligomers or polymers comprising isobutene in copolymerized form have a high content of terminal ethylenic double bonds (α-double bonds), for example at least 50 mol %, preferably at least 60 mol %, more preferably at least 70 mol % and most preferably at least 80 mol %.

Suitable isobutene sources for the preparation of such oligomers or polymers comprising isobutene in copolymerized form are either pure isobutene or isobutene-containing $C_4$ hydrocarbon streams, for example $C_4$ raffinates, especially "raffinate 1", $C_4$ cuts from isobutane dehydrogenation, $C_4$ cuts from steamcrackers and from FCC crackers (fluid catalyzed cracking), provided that they have substantially been freed of 1,3-butadiene present therein. A $C_4$ hydrocarbon stream from an FCC refinery unit is also known as a "b/b" stream. Further suitable isobutene-containing $C_4$ hydrocarbon streams are, for example, the product stream of a propylene-isobutane cooxidation or the product stream from a metathesis unit, which are generally used after customary purification and/or concentration. Suitable $C_4$ hydrocarbon streams comprise generally less than 500 ppm, preferably less than 200 ppm, of butadiene. The presence of 1-butene and of cis- and trans-2-butene is substantially uncritical. Typically, the isobutene concentration in said C$_4$ hydrocarbon streams is in the range from 40 to 60% by weight. For instance, raffinate 1 generally consists essentially of 30 to 50% by weight of isobutene, 10 to 50% by weight of 1-butene, 10 to 40% by weight of cis- and trans-2-butene and 2 to 35% by weight of butanes; in the polymerization process according to the invention, the unbranched butenes in the raffinate 1 are generally virtually inert, and only the isobutene is polymerized.

In a preferred embodiment, the monomer source used for polymerization is a technical C$_4$ hydrocarbon stream having an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream from a propylene-isobutane cooxidation or a product stream from a metathesis unit.

Especially when a raffinate 1 stream is used as isobutene source, the use of water as the sole initiator or as a further initiator has been found to be useful, particularly when polymerization is effected at temperatures of −20° C. to +30° C., especially of 0° C. to +20° C. At temperatures of −20° C. to +30° C., especially of 0° C. to +20° C., however, in the case of use of a raffinate 1 stream as isobutene source, it is possible to dispense with the use of an initiator.

Said isobutene-containing monomer mixture may comprise small amounts of contaminants such as water, carboxylic acids or mineral acids, without resulting in critical yield or selectivity losses. It is appropriate to avoid enrichment of these impurities by removing such harmful substances from the isobutene-containing monomer mixture, for example by adsorption on solid adsorbents such as activated carbon, molecular sieves or ion exchangers.

It is also possible to convert monomer mixtures of isobutene or of the isobutene-containing hydrocarbon mixture with olefinically unsaturated monomers copolymerizable with isobutene. If monomer mixtures of isobutene with suitable comonomers are to be copolymerized, the monomer mixture comprises preferably at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, C$_1$- to C$_4$-alkylstyrenes such as 2-, 3- and 4-methylstyrene and 4-tert-butylstyrene, halostyrenes such as 2-, 3- or 4-chlorostyrene, and isoolefins having 5 to 10 carbon atoms, such as 2-methylbutene-1, 2-methylpentene-1, 2-methylhexene-1, 2-ethylpentene-1, 2-ethylhexene-1 and 2-propylheptene-1. Further useful comonomers include olefins having a silyl group, such as 1-trimethoxysilylethene, 1-(trimethoxysilyl)propene, 1-(trimethoxysilyl)-2-methylpropene-2, 1-[tri(methoxyethoxy)silyl]ethene, 1-[tri(methoxyethoxy)silyl]propene, and 1-[tri(methoxyethoxy)silyl]-2-methylpropene-2. In addition—depending on the polymerization conditions—useful comonomers also include isoprene, 1-butene and cis- and trans-2-butene.

If copolymers are to be prepared by the process according to the invention, the process may be configured so as to form preferentially random polymers or preferentially block copolymers. For preparation of block copolymers, it is possible, for example, to feed the different monomers successively to the polymerization reaction, in which case the second monomer is especially not added until the first comonomer has already at least partly polymerized. In this way, it is possible to obtain diblock, triblock and also higher block copolymers, which, according to the sequence of monomer addition, have a block of one comonomer or another as the terminal block. However, block copolymers also form in some cases when all comonomers are fed simultaneously to the polymerization reaction but one polymerizes significantly more quickly than the other(s). This is the case particularly when isobutene and a vinylaromatic compound, especially styrene, are copolymerized in the process according to the invention. This preferably gives rise to block copolymers having a terminal polystyrene block. The reason for this is that the vinylaromatic compound, specifically styrene, polymerizes significantly more slowly than isobutene.

The molar ratio of olefin 1:olefin 2 (based on the polymerizable double bonds) is generally 0.1:0.9 to 0.95:0.05, preferably 0.2:0.8 to 0.9:0.1, more preferably 0.3:0.7 to 0.85:0.15, even more preferably 0.4:0.6 to 0.8:0.2 and especially 0.5:0.5 to 0.7:0.3.

Carboxylic Acid Unit (m2)

The inventive carboxylic acid unit may especially be an ethylenically unsaturated polycarboxylic acid, in particular an ethylenically unsaturated dicarboxylic acid, for example an optionally substituted C$_4$-C$_8$-dicarboxylic acid or a derivative of an ethylenically unsaturated, optionally substituted C$_4$-C$_8$-dicarboxylic acid. Derivatives are especially hydrocarbyl esters (partly or fully esterified), for example C$_1$-C$_8$ or C$_1$-C$_6$ or C$_1$-C$_4$ alkyl esters or anhydrides.

Nonlimiting examples of ethylenically unsaturated, optionally substituted C$_4$-C$_8$-dicarboxylic acids are maleic acid, fumaric acid, itaconic acid, mesaconic acid, citraconic acid, pent-2-enedioic acid, hex-2-enedioic acid, hex-3-enedioic acid, 5-methylhex-2-enedioic acid, 2,3-dimethylpent-2-enedioic acid, 2-methylbut-2-enedioic acid, 2-dodecylbut-2-enedioic acid and 2-polyisobutylbut-2-enedioic acid; especially maleic acid, or derivatives of ethylenically unsaturated C$_4$-C$_8$-dicarboxylic acid, for example the di- or preferably mono-C$_1$-C$_{10}$-alkyl esters and especially anhydrides. Preference is given to itaconic anhydride and citraconic anhydride, and very particular preference to maleic anhydride.

Particular mention should also be made of the fully esterified lower alkyl esters, i.e. particularly of the C$_{1-4}$- or C$_{1-3}$-alkyl esters, of the abovementioned acids, especially of maleic acid.

The inventive carboxylic acid unit may also be a polymerizable, ethylenically unsaturated, optionally substituted monocarboxylic acid. Suitable substituents are, for example, lower alkyl substituents. Examples include acrylic acid and methacrylic acid, and the derivatives thereof. Derivatives are especially hydrocarbyl esters, for example C$_1$-C$_8$ or C$_1$-C$_6$ or C$_1$-C$_4$ alkyl esters.

After the copolymerization, the copolymer, if it has carboxylic ester or anhydride radicals, can be hydrolyzed fully or partly to polycarboxylic acids. Optionally, the hydrolyzed copolymer can be neutralized fully or partly with ammonia or organic amines.

The copolymer may comprise one, two or more different monomers m2, but especially just one or two different monomers m2.

In one embodiment of the present invention, the molar ratio of (m1) to (m2) is in the range from 0.8:1 to 2:1.

The preparation of copolymers used in the process according to the invention is known per se. It can be effected, for example, by free-radical copolymerization of the comonomers (m1) and (m2) at temperatures in the range from 50 to 250° C., preferably in the range from 80 to 200° C. Copolymers used in the process according to the invention can be prepared by copolymerization in substance or in solution, for example in a paraffin which is liquid at room temperature.

If at least partial neutralization is desired, reaction can be effected, for example, with water at temperatures in the range from preferably 20 to 150° C. The preferred temperature range for the hydrolysis is 60 to 100° C.

Preference is given to hydrolyzing fully or to an extent of greater than 95 mol %.

Examples of copolymers are optionally hydrolyzed copolymers of
1 mol of maleic anhydride and 0.9 mol of diisobutene
1 mol of maleic anhydride and 1 mol of diisobutene
1 mol of maleic anhydride and 0.8 mol of $\alpha$-$C_{10}H_{20}$
1 mol of maleic anhydride and 1 mol of $\alpha$-$C_{10}H_{20}$
1 mol of maleic anhydride and 1 mol of $\alpha$-$C_{12}H_{24}$
1 mol of maleic anhydride and 1 mol of $\alpha$-$C_{16}H_{32}$
1 mol of maleic anhydride and 1 mol of $\alpha$-$C_{18}H_{36}$
1 mol of itaconic anhydride and 1 mol of $\alpha$-$C_{18}H_{36}$
1 mol of maleic anhydride and 1 mol of $C_{20-24}$-olefin
1 mol of maleic anhydride and 0.1 mol of $\alpha$-$C_{10}H_{20}$ and 0.9 mol of $\alpha$-$C_{30}H_{60}$
1 mol of maleic anhydride and 0.3 mol of $\alpha$-$C_{12}H_{24}$ and 0.7 mol of $C_{20-24}$-olefin
1 mol of maleic anhydride and 0.7 mol of $\alpha$-$C_{12}H_{24}$ and 0.3 mol of polyisobutene with molecular weight $M_w$ approx. 500 g/mol,
1 mol of maleic anhydride and 0.3 mol of $\alpha$-$C_{12}H_{24}$ and 0.7 mol of $C_{20-24}$-olefin
1 mol of maleic anhydride and 0.5 mol of $\alpha$-$C_{16}H_{32}$ and 0.5 mol of $C_{20-24}$-olefin
1 mol of maleic anhydride and 0.7 mol of $\alpha$-$C_{18}H_{36}$ and 0.3 mol of $C_{20-24}$-olefin
1 mol of maleic anhydride and 0.9 mol of $C_{20-24}$-olefin and 0.1 mol of polyisobutene with molecular weight $M_w$ 500 g/mol.

Figures in mol each represent the molar ratio.
Further examples are terpolymers, for example
MA:olefin 1:olefin 2 with a molar ratio of 1:0.1:0.9 to 1:0.95:0.05, preferably with a molar ratio of 1:0.2:0.8 to 1:0.9:0.1, more preferably with a molar ratio of 1:0.3:0.7 to 1:0.85:0.15 and most preferably with a molar ratio of 1:0.4:0.6 to 1:0.8:0.2.

Particularly preferred embodiment are the following terpolymers:
MA:olefin 1:olefin 2 with a molar ratio of 1:0.3:0.7.
MA:olefin 1:olefin 2 with a molar ratio of 1:0.5:0.5.
MA:olefin 1:olefin 2 with a molar ratio of 1:0.1:0.9.

For the performance of the process according to the invention, at least one paraffin which is liquid at room temperature, also called paraffin oil, is additionally used. The paraffins which are liquid at room temperature include crude paraffin oils, slack wax raffinates, deoiled crude paraffins, semirefined or fully refined paraffin oils, and bleached paraffin oils, each of which are liquid at room temperature. Paraffins in connection with the present invention are understood to mean saturated hydrocarbons, branched or unbranched, cyclic or preferably acyclic, individually or preferably as a mixture of a plurality of saturated hydrocarbons. Paraffins in connection with the present invention are preferably composed of saturated hydrocarbons having 6 to 30 carbon atoms.

Further suitable solvents are aromatic solvents such as toluene, xylene or solvents from the Solvesso series.

In one embodiment of the present invention, the paraffin which is liquid at room temperature has a broad boiling range from 150 to 230° C., determined at standard pressure.

In a further embodiment, the unhydrolyzed copolymers can also be reacted with primary amines or secondary amines or alcohols to give amides or esters. The products thus obtained can likewise be used in the context of this invention.

A4) Quaternizable Nitrogen Compounds

A4.1) Tertiary Amines of the Formula (3)
Tertiary amines of the formula (3) are compounds known per se, as described, for example, in EP-A-2 033 945.

The tertiary amine reactant 3 preferably bears a segment of the formula $NR_aR_b$ where one of the radicals has an alkyl group having 8 to 40 carbon atoms and the other an alkyl group having up to 40 and more preferably 8 to 40 carbon atoms. The $R_c$ radical is especially a short-chain $C_1$-$C_6$-alkyl radical, such as a methyl, ethyl or propyl group. $R_a$ and $R_b$ may be straight-chain or branched, and/or may be the same or different. For example, $R_a$ and $R_b$ may be a straight-chain $C_{12}$-$C_{24}$-alkyl group. Alternatively, only one of the two radicals may be long-chain (for example having 8 to 40 carbon atoms), and the other may be a methyl, ethyl or propyl group.

Appropriately, the $NR_aR_b$ segment is derived from a secondary amine, such as dioctadecylamine, dicocoamine, hydrogenated ditallowamine and methylbehenylamine. Amine mixtures as obtainable from natural materials are likewise suitable. One example is a secondary hydrogenated tallowamine where the alkyl groups are derived from hydrogenated tallow fat, and contain about 4% by weight of $C_{14}$, 31% by weight of $C_{16}$ and 59% by weight of $C_{18}$-alkyl groups. Corresponding tertiary amines of the formula 3 are sold, for example, by Akzo Nobel under the Armeen® M2HT or Armeen® M2C name.

However, the tertiary amine adduct 3 may also be one where the $R_a$, $R_b$ and $R_c$ radicals have identical or different long-chain alkyl radicals, especially straight-chain or branched alkyl groups having 8 to 40 carbon atoms.

Further nonlimiting examples of suitable amines are: N,N-dimethyl-N-(2-ethylhexyl)amine, N,N-dimethyl-N-(2-propylheptyl)amine, dodecyl-dimethylamine, hexadecyldimethylamine, oleyldimethylamine, cocoyldimethylamine, dicocoylmethylamine, tallowdimethylamine, ditallowmethylamine, tridodecylamine, trihexadecylamine, trioctadecylamine, soyadimethylamine, tris(2-ethylhexyl)amine, and Alamine 336 (tri-n-octylamine).

A4.2) Quaternizable, Polyether-Substituted Amine Comprising at Least One Quaternizable, Especially Tertiary, Amino Group;

Compounds of this kind are described, for example, in the applicant's WO2013/064689, which is hereby explicitly incorporated by reference.

Substituted amines of this kind especially have at least one, especially one, polyether substituent having monomer units of the general formula Ic

in which
$R_3$ and $R_4$ are the same or different and are each H, alkyl, alkylaryl or aryl.

The polyether-substituted amine may have a number-average molecular weight in the range from 500 to 5000, especially 800 to 3000 or 900 to 1500.

The quaternizable, polyether-substituted amines are especially nitrogen compounds of the general formula Ia-1 or Ib-2

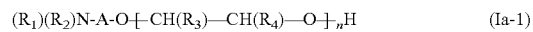

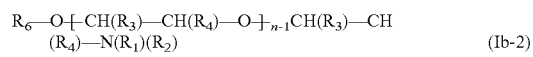

in which $R_1$ and $R_2$ are the same or different and are each alkyl, alkenyl, hydroxyalkyl, hydroxyalkenyl, aminoalkyl or aminoalkenyl, or $R_1$ and $R_2$ together are alkylene, oxyalkylene or aminoalkylene;

$R_3$ and $R_4$ are the same or different and are each H, alkyl, alkylaryl or aryl;

$R_6$ is alkyl, alkenyl, optionally mono- or polyunsaturated cycloalkyl, aryl, in each case optionally substituted, for example by at least one hydroxyl radical or alkyl radical, or interrupted by at least one heteroatom;

A is a straight-chain or branched alkylene radical optionally interrupted by one or more heteroatoms such as N, O and S; and n is an integer value from 1 to 50.

Particular mention should be made of those nitrogen compounds of the formulae Ia-1 and Ib-2 in which $R_1$ and $R_2$ are the same or different and are each $C_1$-$C_6$-alkyl, hydroxy-$C_1$-$C_6$-alkyl, hydroxy-$C_1$-$C_6$-alkenyl, or amino-$C_1$-$C_6$-alkyl, or $R_1$ and $R_2$ together form a $C_2$-$C_6$-alkylene, $C_2$-$C_6$-oxyalkylene or $C_2$-$C_6$-aminoalkylene radical;

$R_3$ and $R_4$ are the same or different and are each H, $C_1$-$C_6$-alkyl or phenyl;

$R_6$ is $C_1$-$C_{20}$-alkyl, for example $C_{10}$-$C_{20}$-, $C_{11}$-$C_{20}$- or $C_{12}$-$C_{20}$-alkyl or aryl or alkylaryl, where alkyl is especially $C_1$-$C_{20}$—;

A is a straight-chain or branched $C_2$-$C_6$-alkylene radical optionally interrupted by one or more heteroatoms such as N, O and S; and n is an integer value from 1 to 30.

Particular mention should additionally be made of reaction products of N,N-dimethylethanolamine and propylene oxide, as described in Synthesis example 1 of WO 2013/064689. This reaction can also be performed without catalysis or with an amine (for example imidazole) as a catalyst, as described, for example, in M. Ionescu, Chemistry and Technology of Polyols for Polyurethanes, 2005, ISBN 978-85957-501-7.

Nitrogen compounds of the general formula Ia-1 are preparable by alkoxylating an aminoalkanol of the general formula II

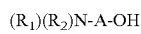  (II)

in which $R_1$, $R_2$ and A are each as defined above with an epoxide of the general formula III

  (III)

in which $R_3$ and $R_4$ are each as defined above to obtain an alkoxylated amine of the formula

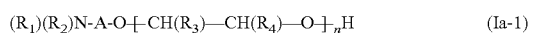  (Ia-1)

in which $R_1$ to $R_4$, A and n are each as defined above.

Nitrogen compounds of the general formula Ia-2 are preparable by alkoxylating an alcohol of the general formula V

  (V)

in which $R_6$ is as defined above with an epoxide of the general formula III

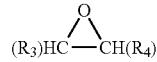  (III)

in which $R_3$ and $R_4$ are each as defined above to obtain a polyether of the formula Ib-1;

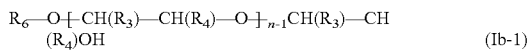  (Ib-1)

in which $R_3$, $R_4$ and $R_5$, A and n are each as defined above and b) then aminating the polyether of the formula Ib-1 thus obtained with an amine of the general formula

  (VII)

in which $R_1$ and $R_2$ are each as defined above
to obtain an amine of the formula Ib-2.

Starting compounds for preparation of polyether-substituted, quaternizable nitrogen compounds are thus:
1) alcohols,
for example of the general formula V

  (V)

in which $R_6$ is alkyl, alkenyl, optionally mono- or polyunsaturated cycloalkyl, aryl, in each case optionally substituted, for example by at least one hydroxyl radical or alkyl radical, or interrupted by at least one heteroatom;
and
2) amino alkanols,
for example of the general formula II

  (II)

in which $R_1$ and $R_2$ are the same or different and are each alkyl, alkenyl, hydroxyalkyl, hydroxyalkenyl, aminoalkyl or aminoalkenyl, or $R_1$ and $R_2$ together are alkylene, oxyalkylene or aminoalkylene; and A is a straight-chain or branched alkylene or alkenylene radical optionally interrupted by one or more heteroatoms such as N, O and S.

A further suitable group of quaternizable amino alcohols that should be mentioned is that of compounds selected from hydroxyalkyl-substituted mono- or polyamines having at least one quaternizable, primary, secondary or tertiary amino group and at least one hydroxyl group which can be joined to a polyether radical.

The quaternizable nitrogen compound is especially selected from hydroxyalkyl-substituted primary, secondary and especially tertiary monoamines, and hydroxyalkyl-substituted primary, secondary and especially tertiary diamines.

Examples of suitable "hydroxyalkyl-substituted mono- or polyamines" are those provided with at least one hydroxyalkyl substituent, for example 1, 2, 3, 4, 5 or 6 hydroxyalkyl substituents.

Examples of "hydroxyalkyl-substituted monoamines" include: N-hydroxyalkylmonoamines, N,N-dihydroxyalkylmonoamines and N,N,N-trihydroxyalkylmonoamines, where the hydroxyalkyl groups are the same or different and are also as defined above. Hydroxyalkyl is especially 2-hydroxyethyl, 3-hydroxypropyl or 4-hydroxybutyl.

For example, the following "hydroxyalkyl-substituted polyamines" and especially "hydroxyalkyl-substituted diamines" may be mentioned: N-hydroxyalkylalkylenediamines, N,N-dihydroxyalkylalkylenediamines, where the hydroxyalkyl groups are the same or different and are also as defined above. Hydroxyalkyl is especially 2-hydroxyethyl, 3-hydroxypropyl or 4-hydroxybutyl; alkylene is especially ethylene, propylene or butylene.

Particular mention should be made of the following quaternizable nitrogen compounds:

| NAME | FORMULA |
|---|---|
| Alcohols with a primary and secondary amine | |
| ethanolamine | (structure) |
| 3-hydroxy-1-propylamine | (structure) |
| diethanolamine | (structure) |
| diisopropanolamine | (structure) |
| N-(2-hydroxyethyl)ethylenediamine | (structure) |
| Alcohols with a tertiary amine | |
| triethanolamine, (2,2′,2″-nitrilotriethanol) | (structure) |
| 1-(3-hydroxypropyl)imidazole | (structure) |
| tris(hydroxymethyl)amine | (structure) |
| 3-dimethylamino-1-propanol | (structure) |
| 3-diethylamino-1-propanol | (structure) |
| 2-dimethylamino-1-ethanol | (structure) |
| 4-diethylamino-1-butanol | (structure) |

For preparation of the polyether-substituted quaternizable compounds (Ia-1 and Ib-1), the procedure may be as follows:

a1) Proceeding from Amino Alcohols of the Formula II:

The amino alcohols of the general formula II can be alkoxylated in a manner known in principle to obtain alkoxylated amines of the general formula Ia-1.

The performance of alkoxylations is known in principle to those skilled in the art. It is likewise known to those skilled in the art that the reaction conditions, especially the selection of the catalyst, can influence the molecular weight distribution of the alkoxylates.

For the alkoxylation, $C_2$-$C_{16}$-alkylene oxides are used, for example ethylene oxide, propylene oxide or butylene oxide. Preference is given to the 1,2-alkylene oxides in each case.

The alkoxylation may be a base-catalyzed alkoxylation. For this purpose, the amino alcohols (II) can be admixed in a pressure reactor with alkali metal hydroxides, preferably potassium hydroxide, or with alkali metal alkoxides, for example sodium methoxide. Water still present in the mixture can be drawn off by means of reduced pressure (for example <100 mbar) and/or increasing the temperature (30 to 150° C.). Thereafter, the alcohol is present in the form of the corresponding alkoxide. This is followed by inertization with inert gas (for example nitrogen) and stepwise addition of the alkylene oxide(s) at temperatures of 60 to 180° C. up to a pressure of max. 10 bar. At the end of the reaction, the catalyst can be neutralized by adding acid (e.g. acetic acid or phosphoric acid) and can be filtered off if required. The basic catalyst can also be neutralized by addition of commercial magnesium silicates, which are subsequently filtered off. Optionally, the alkoxylation can also be performed in the presence of a solvent. This may be, for example, toluene, xylene, dimethylformamide or ethylene carbonate.

The alkoxylation of the amino alcohols can also be undertaken by means of other methods, for example by acid-catalyzed alkoxylation. In addition, it is possible to use, for example, double hydroxide clays, as described in DE 43 25 237 A1, or it is possible to use double metal cyanide catalysts (DMC catalysts). Suitable DMC catalysts are disclosed, for example, in DE 102 43 361 A1, especially paragraphs [0029] to [0041] and the literature cited therein. For example, it is possible to use catalysts of the Zn—Co type. To perform the reaction, the amino alcohol can be admixed with the catalyst, and the mixture dewatered as described above and reacted with the alkylene oxides as described. Typically not more than 1000 ppm of catalyst based on the mixture are used, and the catalyst can remain in the product owing to this small amount. The amount of catalyst may generally be less than 1000 ppm, for example 250 ppm or less. The alkoxylation can alternatively also be undertaken by reaction of the compounds (IV) and (V) with cyclic carbonates, for example ethylene carbonate.

a2) Proceeding from Alkanols of the Formula V:

As described in the above paragraph a1) for amino alcohols (II), it is analogously also possible to alkoxylate alkanols $R_6OH$ in a manner known in principle to polyethers (Ib-1). The polyethers thus obtained can subsequently be converted to the corresponding polyether amines (Ib-2) by reductive amination with ammonia, primary amines or secondary amines (VII) by customary methods, in continuous or batchwise processes using hydrogenation or amination catalysts customary therefor, for example those comprising catalytically active constituents based on the elements Ni, Co, Cu, Fe, Pd, Pt, Ru, Rh, Re, Al, Si, Ti, Zr, Nb, Mg, Zn, Ag, Au, Os, Ir, Cr, Mo, W or combinations of these elements with one another, in customary amounts. The conversion can be performed without solvent or, in the case of high polyether viscosities, in the presence of a solvent, preferably in the presence of branched aliphatics, for example isododecane. The amine component (VII) is generally used here in excess, for example in a 2- to 100-fold excess, preferably a 10- to 80-fold excess. The reaction is conducted at pressures of 10 to 600 bar over a period of 10 minutes to 10 hours. After cooling, the catalyst is removed by filtering, excess amine component (VII) is evaporated and the water of reaction is distilled off azeotropically or under a gentle nitrogen stream.

Should the resulting polyether amine (Ib-2) have primary or secondary amine functionalities ($R_1$ and/or $R_2$ is H), it can subsequently be converted to a polyether amine having a tertiary amine function ($R_1$ and $R_2$ not H). The alkylation can be effected in a manner known in principle by reaction with alkylating agents. Any alkylating agents are suitable in principle, for example alkyl halides, alkylaryl halides, dialkyl sulfates, alkylene oxides, optionally in combination with acid; aliphatic or aromatic carboxylic esters, such as dialkyl carboxylates in particular; alkanoates; cyclic nonaromatic or aromatic carboxylic esters; dialkyl carbonates; and mixtures thereof. The conversions to the tertiary polyether amine can also take place through reductive amination by reaction with a carbonyl compound, for example formaldehyde, in the presence of a reducing agent. Suitable reducing agents are formic acid or hydrogen in the presence of a suitable heterogeneous or homogeneous hydrogenation catalyst. The reactions can be performed without solvent or in the presence of solvents. Suitable solvents are, for example, $H_2O$, alkanols such as methanol or ethanol, or 2-ethylhexanol, aromatic solvents such as toluene, xylene or solvent mixtures from the Solvesso series, or aliphatic solvents, especially mixtures of branched aliphatic solvents. The reactions are conducted at temperatures of 10° C. to 300° C. at pressures of 1 to 600 bar over a period of 10 minutes to 10 h. The reducing agent is used here at least stoichiometrically, preferably in excess, especially in a 2- to 10-fold excess.

The reaction product thus formed (polyether amine Ib-1 or Ib-2) can theoretically be purified further, or the solvent can be removed. Usually, however, this is not absolutely necessary, and so the reaction product can be transferred without further purification into the next synthesis step, the quaternization.

A4.3) Polyalkene-Substituted Amines Having at Least One Tertiary, Quaternizable Nitrogen Group Further suitable quaternizable nitrogen compounds are polyalkene-substituted amines having at least one tertiary nitrogen group. This group of compounds is likewise known and is described, for example, in WO 2008/060888 or US 2008/0113890 and the further prior art cited therein, which is hereby explicitly incorporated by reference.

Such polyalkene-substituted amines having at least one tertiary amino group are derivable from an olefin polymer and an amine such as ammonia, monoamines, polyamines or mixtures thereof. They can be prepared by a multitude of processes, for example the following processes cited by way of example:

A process for preparing a polyalkene-substituted amine comprises the reaction of a halogenated olefin polymer with an amine, as described in U.S. Pat. Nos. 3,275,554, 3,438,757, 3,454,555, 3,565,804, 3,755,433 and 3,822,289.

A further process for preparing a polyalkene-substituted amine comprises the reaction of a hydroformylated olefin with a polyamine and hydrogenation of the reaction product, as described in U.S. Pat. Nos. 5,567,845 and 5,496,383.

A further process for preparing a polyalkene-substituted amine comprises the conversion of a polyalkene with the aid of a conventional epoxidizing reagent with or without catalyst to the corresponding epoxide and the conversion of the epoxide to the polyalkene-substituted amine by reaction with ammonia or an amine under the conditions of reductive amination, as described in U.S. Pat. No. 5,350,429.

A further process for preparing a polyalkene-substituted amine comprises the hydrogenation of a β-amino nitrile which has been prepared by reaction of an amine with a nitrile, as described in U.S. Pat. No. 5,492,641.

A further process for preparing a polyalkene-substituted amine comprises hydroformylation of a polybutene or polyisobutylene with a catalyst, such as rhodium or cobalt, in the presence of CO and hydrogen at elevated pressures and temperatures, as described in U.S. Pat. No. 4,832,702.

In one embodiment of the invention, the polyalkenes used for the preparation are derived from olefin polymers. The olefin polymers may comprise homopolymers and co-polymers of polymerizable olefin monomers having 2 to about 16 carbon atoms, 2 to about 6 carbon atoms or 2 to about 4 carbon atoms.

Interpolymers are those in which two or more olefin monomers are interpolymerized by known conventional methods, giving polyalkenes having units derived from each of the two or more olefin monomers within their structure.

Thus, "interpolymers" comprise copolymers, terpolymers and tetrapolymers.

"Polyalkenes", from which the polyalkene-substituted amines are derived, are conventionally frequently also referred to as "polyolefins".

The olefin monomers from which the olefin polymers are derived are polymerizable olefin monomers having one or more ethylenically unsaturated groups (i.e. >C=C<); in other words, they are monoolefinic monomers such as ethylene, propylene, 1-butene, isobutene (2-methyl-1-butene), 1-octene, or polyolefinic monomers (usually diolefinic monomers) such as 1,3-butadiene and isoprene.

The olefin monomers are usually polymerizable terminal olefins, i.e. olefins having the >C=$CH_2$ group in their structure. However, it is also possible to use polymerizable internal olefin monomers characterized by groups of the formula >C—C=C—C<.

Specific examples of terminal and internal olefin monomers which can be used to prepare the polyalkenes by conventional methods are: ethylene, propylene, the butenes (butylene), especially 1-butene, 2-butene and isobutylene, 1-pentene, 1-hexene, 1-heptene, 1-octene, 1-nonene, 1-decene, 2-pentene, propylene tetramer, diisobutylene, isobutylene trimer, 1,2-butadiene, 1,3-butadiene, 1,2-pentadiene, 1,3-pentadiene, 1,4-pentadiene, isoprene, 1,5-hexadiene, 2-methyl-5-propyl-1-hexene, 3-pentene, 4-octene and 3,3-dimethyl-1-pentene.

In another embodiment, the olefin polymer is preparable by polymerization of a $C_4$ refinery stream having a butene content of about 35 to about 75 percent by weight and an isobutene content of about 30 to about 60 percent by weight in the presence of a Lewis acid catalyst such as aluminum trichloride or boron trifluoride. These polybutenes typically comprise predominantly (more than about 80% of all the repeat units) repeat isobutene units of the (—CH$_2$—C(CH$_3$)$_2$—) type.

In a further embodiment, the polyalkene substituent of the polyalkene-substituted amine is derived from a polyisobutylene.

In another embodiment, the amines which can be used to form the polyalkene-substituted amine comprise ammonia, monoamines, polyamines or mixtures thereof, including mixtures of various monoamines, mixtures of various polyamines and mixtures of monoamines and polyamines (the diamines). The amines comprise aliphatic, aromatic, heterocyclic and carbocyclic amines. Monoamines and polyamines are characterized by the presence in their structure of at least one HN<group. The amines may be aliphatic, cycloaliphatic, aromatic or heterocyclic.

The monoamines are generally substituted by a hydrocarbyl group having 1 to 50 carbon atoms. These hydrocarbyl groups may especially be aliphatic and free of acetylenically unsaturated groups and have 1 to about 30 carbon atoms. Particular mention should be made of saturated aliphatic hydrocarbyl radicals having 1 to 30 carbon atoms.

In a further embodiment, the monoamines may have the formula HNR$_1$R$_2$ where R$_1$ is a hydrocarbyl group having up to 30 carbon atoms and R$_2$ is hydrogen or a hydrocarbyl group having up to about 30 carbon atoms. Examples of suitable monoamines are methylamine, ethylamine, diethylamine, 2-ethylhexylamine, di(2-ethylhexyl)amine, n-butylamine, di-n-butylamine, allylamine, isobutylamine, cocoamine, stearylamine, laurylamine, methyllaurylamines and oleylamine.

Aromatic monoamines are those monoamines in which a carbon atom in the aromatic ring structure is bonded directly to the amine nitrogen atom. The aromatic ring will usually be a monocyclic aromatic ring (i.e. derived from benzene), but may include fused aromatic rings, especially those derived from naphthalene. Examples of aromatic monoamines are aniline, di(para-methylphenyl)amine, naphthylamine, N-(n-butyl)aniline. Examples of aliphatic-substituted, cycloaliphatic-substituted and heterocyclic-substituted aromatic monoamines are: para-dodecylaniline, cyclohexyl-substituted naphthylamine and thienyl-substituted aniline.

Hydroxylamines are likewise suitable monoamines. Compounds of this kind are the hydroxyhydrocarbyl-substituted analogs of the aforementioned monoamines.

In one embodiment, hydroxy monoamines are those of the formula HNR$_3$R$_4$ where R$_3$ is a hydroxyl-substituted alkyl group having up to about 30 carbon atoms, and in one embodiment up to about 10 carbon atoms; and R$_4$ is a hydroxyl-substituted alkyl group having up to about 30 carbon atoms, hydrogen or a hydrocarbyl group having up to about 10 carbon atoms. Examples of hydroxyl-substituted monoamines include: ethanolamine, di-3-propanolamine, 4-hydroxybutylamine, diethanolamine and N-methyl-2-hydroxypropylamine.

In another embodiment, the amine of the polyalkene-substituted amines may be a polyamine. The polyamine may be aliphatic, cycloaliphatic, heterocyclic or aromatic. Examples of the polyamines include: alkylenepolyamines, hydroxyl group-comprising polyamines, aryl polyamines and heterocyclic polyamines.

The alkylenepolyamines comprise those of the following formula:

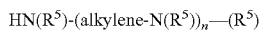

in which n is in the range from 1 to about 10 and, for example, in the range from 2 to about 7, or from 2 to about 5, and the "alkylene" group has 1 to about 10 carbon atoms, for example 2 to about 6, or 2 to about 4 carbon atoms; the R$^5$ radicals are each independently hydrogen, an aliphatic group, a hydroxyl- or amine-substituted aliphatic group of up to about 30 carbon atoms in each case. Typically, R$^5$ is H or lower alkyl (an alkyl group having 1 to about 5 carbon atoms), especially H. Alkylenepolyamines of this kind include: methylenepolyamines, ethylenepolyamines, butylenepolyamines, propylenepolyamines, pentylenepolyamines, hexylenepolyamines and heptylenepolyamines. The higher homologs of such amines and related aminoalkyl-substituted piperazines are likewise included.

Specific alkylenepolyamines for preparation of the polyalkene-substituted amines are the following: ethylenediamine, diethylenetriamine, triethylenetetramine, tetraethylenepentamine, propylenediamine, 3-dimethylaminopropylamine, trimethylenediamine, hexamethylenediamine, decamethylenediamine, octamethylenediamine, di(heptamethylene)triamine, tripropylenetetramine, pentaethylenehexamine, di(trimethylenetriamine), N-(2-aminoethyl)piperazine and 1,4-bis(2-aminoethyl)piperazine.

Ethylenepolyamines, such as those mentioned above, are particularly suitable for reasons of cost and effectiveness. Polyamines of this kind are described in detail in the chapter "Diamine und höhere Amine" [Diamines and Higher Amines] in Encyclopedia of Chemical Technology, second edition, Kirk-Othmer, volume 7, pages 27-39, Inter-science Publishers, division of John Wiley & Sons, 1965. Compounds of this kind are most conveniently prepared by the reaction of an alkylene chloride with ammonia or by reaction of an ethyleneimine with a ring-opening reagent such as ammonia. These reactions lead to preparation of complex mixtures of alkylenepolyamines, including cyclic condensation products such as piperazines.

Other suitable types of polyamine mixtures are the products which are formed as residue by stripping the above-described polyamine mixtures and are frequently referred to as "polyamine bottoms". In general, alkylenepolyamine bottom products are those which comprise less than two, usually less than 1%, by weight of material that boils below about 200° C. A typical example of such ethylenepolyamine bottoms is that of the products designated "E 100" from Dow Chemical Company in Freeport, Tex. These alkylenepolyamine bottoms comprise cyclic condensation products such as piperazine and higher analogs of diethylenetriamine, triethylenetetramines and the like.

Hydroxyl group-comprising polyamines include: hydroxyalkylalkylenepolyamines having one or more hydroxyalkyl substituents on the nitrogen atoms. Polyamines of this kind can be prepared by reacting the above-described alkylenepolyamines with one or more alkylene oxides (e.g. ethylene oxide, propylene oxide and butylene oxide). Similar alkylene oxide-alkanolamine reaction products may also, for example, be the products of the reaction of primary, secondary or tertiary alkanolamines with ethylene, propylene or higher epoxides in a molar ratio of 1:1 to 1:2. Reactant ratios and temperatures for performance of such reactions are known to those skilled in the art.

In another embodiment, the hydroxyalkyl-substituted alkylenepolyamine may be a compound in which the hydroxyalkyl group is a hydroxy-lower alkyl group, i.e. has fewer than eight carbon atoms. Examples of such hydroxyalkyl-substituted polyamines include N-(2-hydroxyethyl)ethylenediamine (also known as 2-(2-aminoethylamino)ethanol), N,N-bis(2-hydroxyethyl)ethylenediamine, 1-(2-hydroxyethyl)piperazine, monohydroxypropyl-substituted diethylenetriamine, dihydroxypropyl-substituted tetraethylenepentamine and N-(3-hydroxybutyl)tetramethylenediamine.

Aryl polyamines are analogs of the abovementioned aromatic monoamines. Examples of aryl polyamines include: N,N'-di-n-butyl-para-phenylenediamine and bis(para-aminophenyl)methane.

Heterocyclic mono- and polyamines may comprise: aziridines, azetidines, azolidines, pyridines, pyrroles, indoles, piperidines, imidazoles, piperazines, isoindoles, purines, morpholines, thiomorpholines, N-aminoalkylmorpholines, N-aminoalkylthiomorpholines, N-aminoalkylpiperazines, N,N'-diaminoalkylpiperazines, azepines, azocines, azonines, azecines and tetra-, di- and perhydro derivatives of each of the above compounds and mixtures of two or more of these heterocyclic amines. Typical heterocyclic amines are saturated 5- and 6-membered heterocyclic amines having only nitrogen, oxygen and/or sulfur in the heterocycle, especially piperidines, piperazines, thiomorpholines, morpholines, pyrrolidines and the like. Piperidine, aminoalkyl-substituted piperidines, piperazine, aminoalkyl-substituted piperazines, morpholine, aminoalkyl-substituted morpholines, pyrrolidine and aminoalkyl-substituted pyrrolidines are particularly preferred. Usually, the aminoalkyl substituents are bonded to a nitrogen atom which is part of the heterocycle.

Specific examples of such heterocyclic amines include N-aminopropylmorpholine, N-aminoethylpiperazine and N,N'-diaminoethylpiperazine. Hydroxyheterocyclic polyamines are also suitable. Examples include: N-(2-hydroxyethyl)cyclohexylamine, 3-hydroxycyclopentylamine, para-hydroxyaniline and N-hydroxyethylpiperazine.

Examples of polyalkene-substituted amines are as follows: poly(propylene)amine, poly(butene)amine, N,N-dimethylpolyisobutyleneamines; polybutenemorpholines, N,N-poly(butene)ethylenediamine, N-poly(propylene)trimethylenediamine, N-poly(butene), diethylenetriamine, N',N'-poly(butene)tetraethylenepentamine and N,N-dimethyl-N'-poly(propylene)-1,3-propylenediamine.

The number-average molecular weight of such polyalkene-substituted amines is about 500 to about 5000, for example 1000 to about 1500 or about 500 to about 3000.

Any of the abovementioned polyalkene-substituted amines which are secondary or primary amines can be alkylated to tertiary amines with alkylating agents which are also known as quaternizing agents, such as dialkyl sulfates, alkyl halides, hydrocarbyl-substituted carbonates; hydrocarbyl epoxides in combination with an acid and mixtures thereof. If particular quaternizing agents, such as alkyl halides or dialkyl sulfates, are used, it may be necessary to provide a base or basic compositions, such as sodium carbonate or sodium hydroxide, to give the free tertiary amine form. Primary amines require two equivalents of alkylating agent and two equivalents of base to obtain a tertiary amine. In another embodiment, the alkylation of primary amines can frequently be conducted in four successive steps, first a treatment with the alkylating agent and a second treatment with a base and then repetition of the two steps. In another embodiment, the alkylation of a primary amine will be effected in one step, for example using two moles of alkyl halide in the presence of an excess of heterogeneous base, such as sodium carbonate. The polyamine can be exhaustively or partially alkylated in a manner known per se.

In another embodiment, the alkylation of primary amines and secondary amines to tertiary amines can be effected with epoxides. Unlike the use of the alkyl halides, no treatment with base is required in the case of use of an epoxide to obtain the free amine. Typically, in the case of alkylation of amines with epoxides, at least one mole of epoxide is used for each hydrogen atom in the amine. In the alkylation to give the tertiary amine with an epoxide, neither additional acid nor base is required.

Particular preference is additionally given to polyisobutenedimethylamine obtainable by hydroformylating polyisobutene (Mn 1000) and subsequent reductive amination with dimethylamine; see Example B of WO 2008/060888.

A4.4) Reaction Products of a Hydrocarbyl-Substituted Acylating Agent and a Compound Comprising a Nitrogen or Oxygen Atom and Additionally Comprising at Least One Quaternizable Amino Group Compounds of this kind are described, for example, in the applicant's WO2013/000997, which is hereby explicitly incorporated by reference.

Suitable hydrocarbyl-substituted polycarboxylic acid compounds, or hydrocarbyl-substituted acylating agents, include:

The polycarboxylic acid compounds used are aliphatic di- or polybasic (for example tri- or tetrabasic), especially from di-, tri- or tetracarboxylic acids and analogs thereof, such as anhydrides or lower alkyl esters (partially or completely esterified), and is optionally substituted by one or more (for example 2 or 3), especially a long-chain alkyl radical and/or a high molecular weight hydrocarbyl radical, especially a polyalkylene radical. Examples are $C_3$-$C_{10}$ polycarboxylic acids, such as the dicarboxylic acids malonic acid, succinic acid, glutaric acid, adipic acid, pimelic acid, suberic acid, azelaic acid and sebacic acid, and the branched analogs thereof; and the tricarboxylic acid citric acid; and anhydrides or lower alkyl esters thereof. The polycarboxylic acid compounds can also be obtained from the corresponding monounsaturated acids and addition of at least one long-chain alkyl radical and/or high molecular weight hydrocarbyl radical. Examples of suitable monounsaturated acids are fumaric acid, maleic acid, itaconic acid.

The hydrophobic "long-chain" or "high molecular weight" hydrocarbyl radical which ensures sufficient solubility of the quaternized product in the fuel has a number-average molecular weight ($M_n$) of 85 to 20 000, for example 113 to 10 000, or 200 to 10 000 or 350 to 5000, for example 350 to 3000, 500 to 2500, 700 to 2500, or 800 to 1500. Typical hydrophobic hydrocarbyl radicals include polypropenyl, polybutenyl and polyisobutenyl radicals, for example with a number-average molecular weight Mn of 3500 to 5000, 350 to 3000, 500 to 2500, 700 to 2500 and 800 to 1500.

Suitable hydrocarbyl-substituted compounds are described, for example, in DE 43 19 672 and WO 2008/138836.

Suitable hydrocarbyl-substituted polycarboxylic acid compounds also comprise polymeric, especially dimeric, forms of such hydrocarbyl-substituted polycarboxylic acid compounds. Dimeric forms comprise, for example, two acid anhydride groups which can be reacted independently with the quaternizable nitrogen compound in the preparation process according to the invention.

The quaternizable nitrogen compounds reactive with the above polycarboxylic acid compound are selected from a) hydroxyalkyl-substituted mono- or polyamines having at least one quaternized (e.g. choline) or quaternizable primary, secondary or tertiary amino group;
b) straight-chain or branched, cyclic, heterocyclic, aromatic or nonaromatic polyamines having at least one primary or secondary (anhydride-reactive) amino group and having at least one quaternized or quaternizable primary, secondary or tertiary amino group;
c) piperazines.

The quaternizable nitrogen compounds are especially selected from
d) hydroxyalkyl-substituted primary, secondary, tertiary or quaternary monoamines and hydroxyalkyl-substituted primary, secondary, tertiary or quaternary diamines;
e) straight-chain or branched aliphatic diamines having two primary amino groups; di- or polyamines having at least one primary and at least one secondary amino group; di- or polyamines having at least one primary and at least one tertiary amino group; di- or polyamines having at least one primary and at least one quaternary amino group; aromatic carbocyclic diamines having two primary amino groups; aromatic heterocyclic polyamines having two primary amino groups; aromatic or nonaromatic heterocycles having one primary and one tertiary amino group.

Examples of suitable "hydroxyalkyl-substituted mono- or polyamines" are those provided with at least one hydroxyalkyl substituted, for example 1, 2, 3, 4, 5 or 6 hydroxyalkyl substituted.

Examples of "hydroxyalkyl-substituted monoamines" include: N-hydroxyalkylmonoamines, N,N-dihydroxyalkylmonoamines and N,N,N-trihydroxyalkylmonoamines, where the hydroxyalkyl groups are the same or different and are also as defined above. Hydroxyalkyl is especially 2-hydroxyethyl, 3-hydroxypropyl or 4-hydroxybutyl.

For example, the following "hydroxyalkyl-substituted polyamines" and especially "hydroxyalkyl-substituted diamines" may be mentioned: N-hydroxyalkylalkylenediamines, N,N-dihydroxyalkylalkylenediamines, where the hydroxyalkyl groups are the same or different and are also as defined above. Hydroxyalkyl is especially 2-hydroxyethyl, 3-hydroxypropyl or 4-hydroxybutyl; alkylene is especially ethylene, propylene or butylene.

Suitable "diamines" are alkylenediamines, and the N-alkyl-substituted analogs thereof, such as N-monoalkylated alkylenediamines and the N,N- or N,N'-dialkylated alkylenediamines. Alkylene is especially straight-chain or branched $C_{1-7}$- or $C_{1-4}$-alkylene as defined above. Alkyl is especially $C_{1-4}$-alkyl as defined above. Examples are especially ethylenediamine, 1,2-propylenediamine, 1,3-propylenediamine, 1,4-butylenediamine and isomers thereof, pentanediamine and isomers thereof, hexanediamine and isomers thereof, heptanediamine and isomers thereof, and singly or multiply, for example singly or doubly, $C_1$-$C_4$-alkylated, for example methylated, derivatives of the aforementioned diamine compounds such as 3-dimethylamino-1-propylamine (DMAPA), N,N-diethylaminopropylamine and N,N-dimethylaminoethylamine.

Suitable straight-chain "polyamines" are, for example, dialkylenetriamine, trialkylenetetramine, tetraalkylenepentamine, pentaalkylenehexamine, and the N-alkyl-substituted analogs thereof, such as N-monoalkylated and the N,N- or N,N'-dialkylated alkylenepolyamines. Alkylene is especially straight-chain or branched $C_{1-7}$- or $C_{1-4}$-alkylene as defined above. Alkyl is especially $C_{1-4}$-alkyl as defined above.

Examples are especially diethylenetriamine, triethylenetetramine, tetraethylenepentamine, pentaethylenehexamine, dipropylenetriamine, tripropylenetetramine, tetrapropylenepentamine, pentapropylenehexamine, dibutylene triamine, tributylenetetramine, tetrabutylenepentamine, pentabutylenehexamine; and the N,N-dialkyl derivatives thereof, especially the N,N-di-$C_{1-4}$-alkyl derivatives thereof. Examples include: N,N-dimethyldimethylenetriamine, N,N-diethyldimethylenetriamine, N,N-dipropyldimethylenetriamine, N,N-dimethyldiethylene-1,2-triamine, N,N-diethyldiethylene-1,2-triamine, N,N-dipropyldiethylene-1,2-triamine, N,N-dimethyldipropylene-1,3-triamine (i.e. DMAPAPA), N,N-diethyldipropylene-1,3-triamine, N,N-dipropyldipropylene-1,3-triamine, N,N-dimethyldibutylene-1,4-triamine, N,N-diethyldibutylene-1,4-triamine, N,N-dipropyldibutylene-1,4-triamine, N,N-dimethyldipentylene-1,5-triamine, N,N-diethyldipentylene-1,5-triamine, N,N-dipropyldipentylene-1,5-triamine, N,N-dimethyldihexylene-1,6-triamine, N,N-diethyldihexylene-1,6-triamine and N,N-dipropyldihexylene-1,6-triamine.

"Aromatic carbocyclic diamines" having two primary amino groups are the diamino-substituted derivatives of benzene, biphenyl, naphthalene, tetrahydronaphthalene, fluorene, indene and phenanthrene.

"Aromatic or nonaromatic heterocyclic polyamines" having two primary amino groups are the derivatives, substituted by two amino groups, of the following heterocycles:

5- or 6-membered, saturated or monounsaturated heterocycles comprising one to two nitrogen atoms and/or one oxygen or sulfur atom or one or two oxygen and/or sulfur atoms as ring members, for example tetrahydrofuran, pyrrolidine, isoxazolidine, isothiazolidine, pyrazolidine, oxazolidine, thiazolidine, imidazolidine, pyrroline, piperidine, piperidinyl, 1,3-dioxane, tetrahydropyran, hexahydropyridazine, hexahydropyrimidine, piperazine;

5-membered aromatic heterocycles comprising, in addition to carbon atoms, one, two or three nitrogen atoms or one or two nitrogen atoms and one sulfur or oxygen atom as ring members, for example furan, thiane, pyrrole, pyrazole, oxazole, thiazole, imidazole and 1,3, 4-triazole; isoxazole, isothiazole, thiadiazole, oxadiazole;

6-membered heterocycles comprising, in addition to carbon atoms, one or two, or one, two or three, nitrogen atoms as ring members, for example pyridinyl, pyridazine, pyrimidine, pyrazinyl, 1,2,4-triazine, 1,3,5-triazin-2-yl.

"Aromatic or nonaromatic heterocycles having one primary and one tertiary amino group" are, for example, the abovementioned N-heterocycles which are aminoalkylated on at least one ring nitrogen atom, and especially bear an amino-$C_{1-4}$-alkyl group.

"Aromatic or nonaromatic heterocycles having one tertiary amino group and one hydroxyalkyl group" are, for example, the abovementioned N-heterocycles which are hydroxyalkylated on at least one ring nitrogen atom, and especially bear a hydroxy-$C_{1-4}$-alkyl group.

Particular mention should be made especially of the following groups of individual classes of quaternizable nitrogen compounds:

Group 1:

| NAME | FORMULA |
|---|---|
| Diamines with primary second nitrogen atom | |
| ethylenediamine | 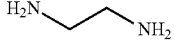 |
| 1,2-propylenediamine | 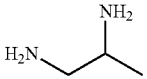 |
| 1,3-propylenediamine | 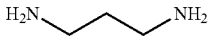 |
| Isomeric butylenediamines, for example | 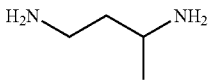 |
| 1,5-pentylenediamine |  |
| Isomeric pentanediamines, for example | 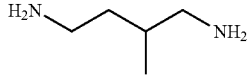 |
| Isomeric hexanediamines, for example | 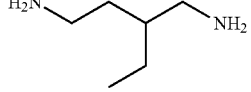 |
| Isomeric heptanediamines, for example | 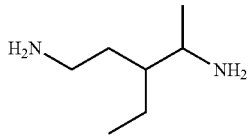 |
| Di- and polyamines with a secondary second nitrogen atom | |
| diethylenetriamine (DETA) | 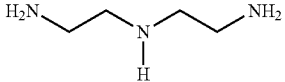 |
| dipropylenetriamine (DPTA), 3,3'-iminobis(N,N-dimethylpropylamine) | 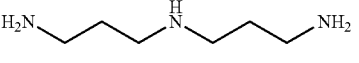 |
| triethylenetetramine (TETA) | 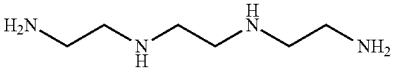 |
| tetraethylenepentamine (TEPA) | 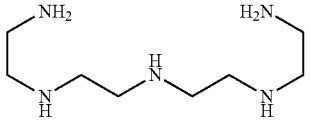 [SMILES: NCCNCCNCCNCCN] |
| pentaethylenehexamine | 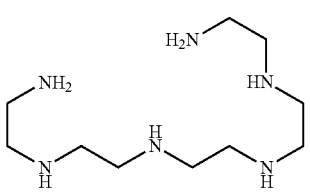 [SMILES: NCCNCCNCCNCCNCCN] |
| N-methyl-3-amino-1-propylamine | 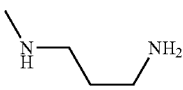 |

| NAME | FORMULA |
|---|---|
| bishexamethylenetriamine | H₂N-(CH₂)₆-NH-(CH₂)₆-NH₂ (with additional -(CH₂)₆-NH₂ branch on N) |

Aromatics

| | |
|---|---|
| Diaminobenzenes, for example | 1,2-diaminobenzene (H₂N, H₂N on adjacent benzene positions) |
| Diaminopyridines, for example | 2,3-diaminopyridine |

Group 2:

| NAME | FORMULA |
|---|---|
| Heterocycles | |
| 1-(3-aminopropyl)imidazole | H₂N-CH₂CH₂CH₂-(imidazole) |
| 4-(3-aminopropyl)morpholine | morpholine-N-CH₂CH₂CH₂-NH₂ |
| 1-(2-aminoethylpiperidine) | piperidine-N-CH₂CH₂-NH₂ |
| 2-(1-piperazinyl)ethylamine (AEP) | piperazine-N-CH₂CH₂-NH₂ |
| N-methylpiperazine | N-methylpiperazine |
| Amines with a tertiary second nitrogen atom | |
| 3,3-diamino-N-methyldipropylamine | H₂N-CH₂CH₂CH₂-N(CH₃)-CH₂CH₂CH₂-NH₂ |
| 3-dimethylamino-1-propylamine (DMAPA) | H₂N-CH₂CH₂CH₂-N(CH₃)₂ |
| N,N-diethylaminopropylamine | H₂N-CH₂CH₂CH₂-N(C₂H₅)₂ |
| N,N-dimethylaminoethylamine | H₂N-CH₂CH₂-N(CH₃)₂ |

Group 3:

| NAME | FORMULA |
|---|---|
| Alcohols with a primary and secondary amine | |
| ethanolamine | H₂N-CH₂CH₂-OH |
| 3-hydroxy-1-propylamine | H₂N-CH₂CH₂CH₂-OH |
| diethanolamine | HO-CH₂CH₂-NH-CH₂CH₂-OH |
| diisopropanolamine | HO-CH(CH₃)-CH₂-NH-CH₂-CH(CH₃)-OH |
| N-(2-hydroxyethyl)ethylenediamine | HO-CH₂CH₂-NH-CH₂CH₂-NH₂ |

| NAME | FORMULA |
|---|---|
| Alcohols with a tertiary amine | |
| triethanolamine, (2,2′,2″-nitrilotriethanol) | HO-CH₂CH₂-N(CH₂CH₂OH)₂ |
| 1-(3-hydroxypropyl)imidazole | HO-(CH₂)₃-imidazole |
| tris(hydroxymethyl)amine | N(CH₂OH)₃ |
| 3-dimethylamino-1-propanol | (CH₃)₂N-(CH₂)₃-OH |
| 3-diethylamino-1-propanol | HO-(CH₂)₃-N(C₂H₅)₂ |
| 2-dimethylamino-1-ethanol | HO-CH₂CH₂-N(CH₃)₂ |
| 4-diethylamino-1-butanol | HO-(CH₂)₄-N(C₂H₅)₂ |

The hydrocarbyl-substituted polycarboxylic acid compound can be reacted with the quaternizable nitrogen compound under thermally controlled conditions, such that there is essentially no condensation reaction. More particularly, no formation of water of reaction is observed in that case. More particularly, such a reaction is effected at a temperature in the range from 10 to 80° C., especially 20 to 60° C. or 30 to 50° C. The reaction time may be in the range from a few minutes or a few hours, for example about 1 minute up to about 10 hours. The reaction can be effected at pressure at about 0.1 to 2 atm, but especially at about standard pressure. For example, an inert gas atmosphere is appropriate, for example nitrogen.

More particularly, the reaction can also be effected at elevated temperatures which promote condensation, for example in the range from 90 to 100° C. or 100 to 170° C. The reaction time may be in the region of a few minutes or a few hours, for example about 1 minute up to about 10 hours. The reaction can be effected at pressure at about 0.1 to 2 atm, but especially at about standard pressure.

The reactants are initially charged especially in about equimolar amounts; optionally, a small molar excess of the polycarboxylic acid compound, for example a 0.05- to 0.5-fold, for example a 0.1- to 0.3-fold, excess, is desirable.

If required, the reactants can be initially charged in a suitable inert organic aliphatic or aromatic solvent or a mixture thereof. Typical examples are, for example, solvents of the Solvesso series, toluene or xylene. The solvent can also serve, for example, to remove water of condensation azeotropically from the reaction mixture. More particularly, however, the reactions are performed without solvent.

The reaction product thus formed can theoretically be purified further, or the solvent can be removed. Usually, however, this is not absolutely necessary, such that the reaction product can be transferred without further purification into the next synthesis step, the quaternization.

Particular mention should be made of the condensation product of polyisobutylenesuccinic anhydride (Glissopal® SA from BASF, prepared from polyisobutene (Mn 1000) and maleic anhydride in a known manner) and N,N-dimethyl-1,3-diaminopropane (CAS 109-55-7), see Preparation example 1 of WO 2013/000997.

A5) Epoxides of the Formula (4)

According to the invention, the at least one quaternizable tertiary nitrogen atom is quaternized with at least one quaternizing agent selected from epoxides, especially hydrocarbyl epoxides.

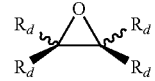

(4)

where the $R_d$ radicals present therein are the same or different and are each H or a hydrocarbyl radical, where the hydrocarbyl radical has at least 1 to 10 carbon atoms. More particularly, these are aliphatic or aromatic radicals, for example linear or branched $C_{1-10}$-alkyl radicals, or aromatic radicals, such as phenyl or $C_{1-4}$-alkylphenyl.

Examples of suitable hydrocarbyl epoxides include aliphatic and aromatic alkylene oxides such as, more particularly, $C_{2-12}$-alkylene oxides such as ethylene oxide, propylene oxide, 1,2-butylene oxide, 2,3-butylene oxide, 2-methyl-1,2-propene oxide (isobutene oxide), 1,2-pentene oxide, 2,3-pentene oxide, 2-methyl-1,2-butene oxide, 3-methyl-1,2-butene oxide, 1,2-hexene oxide, 2,3-hexene oxide, 3,4-hexene oxide, 2-methyl-1,2-pentene oxide, 2-ethyl-1,2-butene oxide, 3-methyl-1,2-pentene oxide, 1,2-decene oxide, 1,2-dodecene oxide or 4-methyl-1,2-pentene oxide; and aromatic-substituted ethylene oxides such as optionally substituted styrene oxide, especially styrene oxide or 4-methylstyrene oxide.

A6) Preparation of Inventive Additives a) Quaternization

The quaternization is performed in a manner known per se.

To perform the quaternization, the tertiary amine is admixed with at least one compound of the above formula 2, especially in the stoichiometric amounts required to achieve the desired quaternization. It is possible to use, for example, 0.1 to 5.0, 0.2 to 3.0 or 0.5 to 2.5 equivalents of quaternizing agent per equivalent of quaternizable tertiary nitrogen atom. More particularly, however, about 1 to 2 equivalents of quaternizing agent are used in relation to the tertiary amine, in order to fully quaternize the tertiary amine group.

Typical working temperatures here are in the range from 50 to 180° C., for example 90 to 160° C. or 100 to 140° C. The reaction time may be in the region of a few minutes or a few hours, for example about 10 minutes up to about 24 hours. The reaction can be effected at a pressure of about 0.1 to 20 bar, for example 1 to 10 or 1.5 to 3 bar, but especially at about standard pressure.

If required, the reactants can be initially charged for the quaternization in a suitable inert organic aliphatic or aromatic solvent or a mixture thereof. Typical examples are, for example, solvents of the Solvesso series, toluene or xylene, or ethylhexanol. However, the quaternization can also be performed in the absence of a solvent.

To perform the quaternization, the addition of catalytically active amounts of an acid may be appropriate. Preference is given to aliphatic monocarboxylic acids, for example $C_1$-$C_{18}$-monocarboxylic acids such as, more particularly, lauric acid, isononanoic acid or 3,5,5-trimethylhexanoic acid or neodecanoic acid, but also aliphatic dicarboxylic acids or polybasic aliphatic carboxylic acids with a carbon atom number in the range specified above. The quaternization can also be performed in the presence of a Lewis acid. The quaternization can, however, also be performed in the absence of any acid.

b) Transesterification

Suitable conditions are common knowledge and are described, for example, in standard organic chemistry textbooks, for example, Vollhardt, Organic Chemistry, Wiley publishers, Morrison Boyd, Organic Chemistry, VCh, Otera, Esterification, Wiley publishers.

c) Amidation

Suitable conditions are common knowledge and are described, for example, in standard organic chemistry textbooks, for example Vollhardt, Organic Chemistry, Wiley publishers, Morrison Boyd, Organic Chemistry, VCh.

d) Workup of the Reaction Mixture

The reaction end product thus formed can theoretically be purified further, or the solvent can be removed. Optionally, excess reagent, for example excess epoxide, amine and/or alcohol, can be removed. This can be accomplished, for example, by introducing nitrogen at standard pressure or under reduced pressure. In order to improve the further processibility of the products, however, it is also possible to add solvents after the reaction, for example solvents of the Solvesso series, 2-ethylhexanol, or essentially aliphatic solvents. Usually, however, this is not absolutely necessary, and so the reaction product is usable without further purification as an additive, optionally after blending with further additive components (see below).

B1) Additive Combinations

In a preferred embodiment, the inventive compounds may be combined with quaternized compounds, as described in WO 2012/004300, preferably page 5 line 18 to page 33 line 5 therein, more preferably preparation example 1, each of which is hereby expressly incorporated into the present disclosure by way of reference.

In a further preferred embodiment, the inventive compounds may be combined with quaternized compounds, as described in the unpublished international application with reference number PCT/EP2014/061834 and filing date Jun. 6, 2014, preferably page 5 line 21 to page 47 line 34 therein, more preferably preparation examples 1 to 17.

In a further preferred embodiment, the inventive compounds may be combined with quaternized compounds, as described in WO 11/95819 A1, preferably page 4 line 5 to page 13 line 26 therein, more preferably preparation example 2.

In a further preferred embodiment, the inventive compounds may be combined with quaternized compounds, as described in WO 11/110860 A1, preferably page 4 line 7 to page 16 line 26 therein, more preferably preparation examples 8, 9, 11 and 13.

In a further preferred embodiment, the inventive compounds may be combined with quaternized compounds, as described in WO 06/135881 A2, preferably page 5 line 14 to page 12 line 14 therein, more preferably examples 1 to 4.

In a further preferred embodiment, the inventive compounds may be combined with quaternized compounds, as described in WO 10/132259 A1, preferably page 3 line 29 to page 10 line 21 therein, more preferably example 3.

In a further preferred embodiment, the inventive compounds may be combined with quaternized compounds, as described in WO 08/060888 A2, preferably page 6 line 15 to page 14 line 29 therein, more preferably examples 1 to 4.

In a further preferred embodiment, the inventive compounds may be combined with quaternized compounds, as described in GB 2496514 A, preferably paragraphs [00012] to [00039] therein, more preferably examples 1 to 3.

In a further preferred embodiment, the inventive compounds may be combined with quaternized compounds, as described in WO 2013 070503 A1, preferably paragraphs [00011] to [00039] therein, more preferably examples 1 to 5.

As a nonlimiting example of a suitable group of inventive compounds usable in the abovementioned combinations, particular mention should be made of those from the above-detailed embodiments 1 and 2.

Mention should be made of olefin-polymerizable carboxylic acid copolymers (i.e. copolymer of at least one olefin and at least one polymerizable carboxylic acid), where the copolymer comprises at least one free carboxylic acid side group; where the polymerizable carboxylic acid is a polymerizable mono- or polycarboxylic acid, especially monocarboxylic acid or dicarboxylic acid, such as $C_4$-$C_8$ dicarboxylic acids, for example acrylic acid, methacrylic acid or maleic acid, and the olefin is at least one polymerizable $C_{18}$-$C_{26}$-α-olefin, such as especially a $C_{18}$-$C_{22}$-, $C_{20}$-$C_{24}$- or especially $C_{20}$-α-olefin.

Mention should also be made of copolymers, copolymer-containing reaction products or a copolymer-containing fraction thereof, where the copolymer is obtainable by
(1) copolymerization of
a) at least one ethylenically unsaturated, polymerizable $C_4$-$C_8$-dicarboxylic anhydride, especially maleic anhydride, with
b) at least one polymerizable $C_{18}$-$C_{26}$-α-olefin, such as especially a $C_{18}$-$C_{22}$-, $C_{20}$-$C_{24}$- or especially $C_{20}$-α-olefin;
(2) subsequent derivatization of the copolymer from step (1) by partial or complete reaction of the anhydride radicals of the copolymer from step (1) with water to form a copolymer derivative containing carboxyl groups.

B2) Further Additive Components

The fuel additized with the inventive quaternized additive is a gasoline fuel or especially a middle distillate fuel, in particular a diesel fuel.

The fuel may comprise further customary additives to improve efficacy and/or suppress wear.

In the case of diesel fuels, these are primarily customary detergent additives, carrier oils, cold flow improvers, lubricity improvers, corrosion inhibitors, demulsifiers, dehazers, antifoams, cetane number improvers, combustion improvers, antioxidants or stabilizers, antistats, metallocenes, metal deactivators, dyes and/or solvents.

In the case of gasoline fuels, these are in particular lubricity improvers (friction modifiers), corrosion inhibitors, demulsifiers, dehazers, antifoams, combustion improvers, antioxidants or stabilizers, antistats, metallocenes, metal deactivators, dyes and/or solvents.

Typical examples of suitable coadditives are listed in the following section:

B1) Detergent Additives

The customary detergent additives are preferably amphiphilic substances which possess at least one hydrophobic hydrocarbon radical with a number-average molecular weight ($M_n$) of 85 to 20 000 and at least one polar moiety selected from:

(Da) mono- or polyamino groups having up to 6 nitrogen atoms, at least one nitrogen atom having basic properties;
(Db) nitro groups, optionally in combination with hydroxyl groups;
(Dc) hydroxyl groups in combination with mono- or polyamino groups, at least one nitrogen atom having basic properties;
(Dd) carboxyl groups or the alkali metal or alkaline earth metal salts thereof;
(De) sulfonic acid groups or the alkali metal or alkaline earth metal salts thereof;
(Df) polyoxy-$C_2$- to $C_4$-alkylene moieties terminated by hydroxyl groups, mono- or polyamino groups, at least one nitrogen atom having basic properties, or by carbamate groups;
(Dg) carboxylic ester groups;
(Dh) moieties derived from succinic anhydride and having hydroxyl and/or amino and/or amido and/or imido groups; and/or
(Di) moieties obtained by Mannich reaction of substituted phenols with aldehydes and mono- or polyamines.

The hydrophobic hydrocarbon radical in the above detergent additives, which ensures the adequate solubility in the fuel, has a number-average molecular weight (Mn) of 85 to 20 000, preferably of 113 to 10 000, more preferably of 300 to 5000, even more preferably of 300 to 3000, even more especially preferably of 500 to 2500 and especially of 700 to 2500, in particular of 800 to 1500. Useful typical hydrophobic hydrocarbon radicals, especially in conjunction with the polar groups, are especially polypropenyl, polybutenyl and polyisobutenyl radicals with a number-average molecular weight Mn of preferably in each case 300 to 5000, more preferably 300 to 3000, even more preferably 500 to 2500, even more especially preferably 700 to 2500 and especially 800 to 1500.

Examples of the above groups of detergent additives include the following:

Additives comprising mono- or polyamino groups (Da) are preferably polyalkenemono- or polyalkenepolyamines based on polypropene or on high-reactivity (i.e. having predominantly terminal double bonds) or conventional (i.e. having predominantly internal double bonds) polybutene or polyisobutene with Mn=300 to 5000, more preferably 500 to 2500 and especially 700 to 2500. Such additives based on high-reactivity polyisobutene, which can be prepared from the polyisobutene which may comprise up to 20% by weight of n-butene units by hydroformylation and reductive amination with ammonia, monoamines or polyamines such as dimethylaminopropylamine, ethylenediamine, diethylenetriamine, triethylenetetramine or tetraethylenepentamine, are known especially from EP-A 244 616. When polybutene or polyisobutene having predominantly internal double bonds (usually in the β and γ positions) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or the abovementioned polyamines. Corresponding additives based on polypropene are described more particularly in WO-A 94/24231.

Further particular additives comprising monoamino groups (Da) are the hydrogenation products of the reaction products of polyisobutenes having an average degree of polymerization P=5 to 100 with nitrogen oxides or mixtures of nitrogen oxides and oxygen, as described more particularly in WO-A 97/03946.

Further particular additives comprising monoamino groups (Da) are the compounds obtainable from polyisobutene epoxides by reaction with amines and subsequent dehydration and reduction of the amino alcohols, as described more particularly in DE-A 196 20 262.

Additives comprising nitro groups (Db), optionally in combination with hydroxyl groups, are preferably reaction products of polyisobutenes having an average degree of polymerization P=5 to 100 or 10 to 100 with nitrogen oxides or mixtures of nitrogen oxides and oxygen, as described more particularly in WO-A 96/03367 and in WO-A 96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Additives comprising hydroxyl groups in combination with mono- or polyamino groups (Dc) are especially reaction products of polyisobutene epoxides obtainable from polyisobutene having preferably predominantly terminal double bonds and $M_n$=300 to 5000, with ammonia or mono- or polyamines, as described more particularly in EP-A 476 485.

Additives comprising carboxyl groups or their alkali metal or alkaline earth metal salts (Dd) are preferably copolymers of $C_2$- to $C_{40}$-olefins with maleic anhydride which have a total molar mass of 500 to 20 000 and wherein some or all of the carboxyl groups have been converted to the alkali metal or alkaline earth metal salts and any remainder of the carboxyl groups has been reacted with alcohols or amines. Such additives are disclosed more particularly by EP-A 307 815. Such additives serve mainly to prevent valve seat wear and can, as described in WO-A 87/01126, advantageously be used in combination with customary fuel detergents such as poly(iso)buteneamines or polyetheramines.

Additives comprising sulfonic acid groups or their alkali metal or alkaline earth metal salts (De) are preferably alkali metal or alkaline earth metal salts of an alkyl sulfosuccinate, as described more particularly in EP-A 639 632. Such additives serve mainly to prevent valve seat wear and can be used advantageously in combination with customary fuel detergents such as poly(iso)buteneamines or polyetheramines.

Additives comprising polyoxy-$C_2$-$C_4$-alkylene moieties (Df) are preferably polyethers or polyetheramines which are obtainable by reaction of $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. In the case of polyethers, such products also have carrier oil properties. Typical examples thereof are tridecanol butoxylates or isotridecanol butoxylates, isononylphenol butoxylates and also polyisobutenol butoxylates and propoxylates, and also the corresponding reaction products with ammonia.

Additives comprising carboxylic ester groups (Dg) are preferably esters of mono-, di- or tricarboxylic acids with long-chain alkanols or polyols, especially those having a minimum viscosity of 2 mm$^2$/s at 100° C., as described more particularly in DE-A 38 38 918. The mono-, di- or tricarboxylic acids used may be aliphatic or aromatic acids, and particularly suitable ester alcohols or ester polyols are long-chain representatives having, for example, 6 to 24 carbon atoms. Typical representatives of the esters are adipates, phthalates, isophthalates, terephthalates and trimellitates of isooctanol, of isononanol, of isodecanol and of isotridecanol. Such products also satisfy carrier oil properties.

Additives comprising moieties derived from succinic anhydride and having hydroxyl and/or amino and/or amido and/or especially imido groups (Dh) are preferably corresponding derivatives of alkyl- or alkenyl-substituted succinic anhydride and especially the corresponding derivatives of polyisobutenylsuccinic anhydride which are obtainable by reacting conventional or high-reactivity polyisobutene having $M_n$=preferably 300 to 5000, more preferably 300 to 3000, even more preferably 500 to 2500, even more especially preferably 700 to 2500 and especially 800 to 1500, with maleic anhydride by a thermal route in an ene reaction or via the chlorinated polyisobutene. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. In the presence of imido moieties D(h), the further detergent additive in the context of the present invention is, however, used only up to a maximum of 100% of the weight of compounds with betaine structure. Such fuel additives are common knowledge and are described, for example, in documents (1) and (2). They are preferably the reaction products of alkyl- or alkenyl-substituted succinic acids or derivatives thereof with amines and more preferably the reaction products of polyisobutenyl-substituted succinic acids or derivatives thereof with amines. Of particular interest in this context are reaction products with aliphatic polyamines (polyalkyleneimines) such as especially ethylenediamine, diethylenetriamine, triethylenetetramine, tetraethylenepentamine, pentaethylenehexamine and hexaethyleneheptamine, which have an imide structure.

Additives comprising moieties (Di) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may originate from conventional or high-reactivity polyisobutene having Mn=300 to 5000. Such "polyisobutene Mannich bases" are described more particularly in EP-A 831 141.

One or more of the detergent additives mentioned can be added to the fuel in such an amount that the dosage rate of these detergent additives is preferably 25 to 2500 ppm by weight, especially 75 to 1500 ppm by weight, in particular 150 to 1000 ppm by weight.

B2) Carrier Oils

Carrier oils additionally used may be of mineral or synthetic nature. Suitable mineral carrier oils are fractions obtained in crude oil processing, such as brightstock or base oils having viscosities, for example, from the SN 500-2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized). Likewise suitable are mixtures of the abovementioned mineral carrier oils.

Examples of suitable synthetic carrier oils are polyolefins (polyalphaolefins or polyinternalolefins), (poly)esters, (poly)alkoxylates, polyethers, aliphatic polyetheramines, alkylphenol-started polyethers, alkylphenol-started polyetheramines and carboxylic esters of long-chain alkanols.

Examples of suitable polyolefins are olefin polymers having $M_n$=400 to 1800, in particular based on polybutene or polyisobutene (hydrogenated or unhydrogenated).

Examples of suitable polyethers or polyetheramines are preferably compounds comprising polyoxy-$C_2$- to $C_4$-alkylene moieties obtainable by reacting $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. For example, the polyetheramines used may be poly-$C_2$- to $C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are more particularly esters of mono-, di- or tricarboxylic acids with long-chain alkanols or polyols, as described more particularly in DE-A 38 38 918. The mono-, di- or tricarboxylic acids used may be aliphatic or aromatic acids; particularly suitable ester alcohols or ester polyols are long-chain representatives having, for example, 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A 38 26 608, DE-A 41 42 241, DE-A 43 09 074, EP-A 452 328 and EP-A 548 617.

Examples of particularly suitable synthetic carrier oils are alcohol-started polyethers having about 5 to 35, preferably about 5 to 30, more preferably 10 to 30 and especially 15 to 30 $C_3$- to $C_6$-alkylene oxide units, for example propylene oxide, n-butylene oxide and isobutylene oxide units, or mixtures thereof, per alcohol molecule. Nonlimiting examples of suitable starter alcohols are long-chain alkanols or phenols substituted by long-chain alkyl in which the long-chain alkyl radical is especially a straight-chain or branched $C_6$- to $C_{18}$-alkyl radical. Particular examples include tridecanol and nonylphenol. Particularly preferred alcohol-started polyethers are the reaction products (polyetherification products) of monohydric aliphatic $C_6$- to $C_{18}$-alcohols with $C_3$- to $C_6$-alkylene oxides. Examples of monohydric aliphatic $C_6$-$C_{18}$-alcohols are hexanol, heptanol, octanol, 2-ethylhexanol, nonyl alcohol, decanol, 3-propylheptanol, undecanol, dodecanol, tridecanol, tetradecanol, pentadecanol, hexadecanol, octadecanol and the constitutional and positional isomers thereof. The alcohols can be used either in the form of the pure isomers or in the form of technical grade mixtures. A particularly preferred alcohol is tridecanol. Examples of $C_3$- to $C_6$-alkylene oxides are propylene oxide, such as 1,2-propylene oxide, butylene oxide, such as 1,2-butylene oxide, 2,3-butylene oxide, isobutylene oxide or tetrahydrofuran, pentylene oxide and hexylene oxide. Particular preference among these is given to $C_3$- to $C_4$-alkylene oxides, i.e. propylene oxide such as 1,2-propylene oxide and butylene oxide such as 1,2-butylene oxide, 2,3-butylene oxide and isobutylene oxide. Especially butylene oxide is used.

Further suitable synthetic carrier oils are alkoxylated alkylphenols, as described in DE-A 10 102 913.

Particular carrier oils are synthetic carrier oils, particular preference being given to the above-described alcohol-started polyethers.

The carrier oil or the mixture of different carrier oils is added to the fuel in an amount of preferably 1 to 1000 ppm by weight, more preferably of 10 to 500 ppm by weight and especially of 20 to 100 ppm by weight.

B3) Cold Flow Improvers

Suitable cold flow improvers are in principle all organic compounds which are capable of improving the flow performance of middle distillate fuels or diesel fuels under cold conditions. For the intended purpose, they must have sufficient oil solubility. More particularly, useful cold flow improvers for this purpose are the cold flow improvers (middle distillate flow improvers, MDFIs) typically used in the case of middle distillates of fossil origin, i.e. in the case of customary mineral diesel fuels. However, it is also possible to use organic compounds which partly or predominantly have the properties of a wax antisettling additive (WASA) when used in customary diesel fuels. They can also act partly or predominantly as nucleators. It is also possible to use mixtures of organic compounds effective as MDFIs and/or effective as WASAs and/or effective as nucleators.

The cold flow improver is typically selected from
(K1) copolymers of a $C_2$- to $C_{40}$-olefin with at least one further ethylenically unsaturated monomer;
(K2) comb polymer;
(K3) polyoxyalkylenes;
(K4) polar nitrogen compounds;
(K5) sulfocarboxylic acids or sulfonic acids or derivatives thereof; and
(K6) poly(meth)acrylic esters.

It is possible to use either mixtures of different representatives from one of the particular classes (K1) to (K6) or mixtures of representatives from different classes (K1) to (K6).

Suitable $C_2$- to $C_{40}$-olefin monomers for the copolymers of class (K1) are, for example, those having 2 to 20 and especially 2 to 10 carbon atoms, and 1 to 3 and preferably 1 or 2 carbon-carbon double bonds, especially having one carbon-carbon double bond. In the latter case, the carbon-carbon double bond may be arranged either terminally (α-olefins) or internally. However, preference is given to α-olefins, particular preference to α-olefins having 2 to 6 carbon atoms, for example propene, 1-butene, 1-pentene, 1-hexene and in particular ethylene.

In the copolymers of class (K1), the at least one further ethylenically unsaturated monomer is preferably selected from alkenyl carboxylates, (meth)acrylic esters and further olefins.

When further olefins are also copolymerized, they are preferably higher in molecular weight than the abovementioned $C_2$- to $C_{40}$-olefin base monomers. When, for example, the olefin base monomer used is ethylene or propene, suitable further olefins are especially $C_{10}$- to $C_{40}$-α-olefins. Further olefins are in most cases only additionally copolymerized when monomers with carboxylic ester functions are also used.

Suitable (meth)acrylic esters are, for example, esters of (meth)acrylic acid with $C_1$- to $C_{20}$-alkanols, especially $C_1$- to $C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol, and structural isomers thereof.

Suitable alkenyl carboxylates are, for example, $C_2$- to $C_{14}$-alkenyl esters, for example the vinyl and propenyl esters, of carboxylic acids having 2 to 21 carbon atoms, whose hydrocarbyl radical may be linear or branched. Among these, preference is given to the vinyl esters. Among the carboxylic acids with a branched hydrocarbyl radical, preference is given to those whose branch is in the α position to the carboxyl group, and the α-carbon atom is more preferably tertiary, i.e. the carboxylic acid is what is called a neocarboxylic acid. However, the hydrocarbyl radical of the carboxylic acid is preferably linear.

Examples of suitable alkenyl carboxylates are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate; typical copolymers of group (K1) resulting therefrom are ethylene-vinyl acetate copolymers ("EVAs"), which are some of the most frequently used.

Ethylene-vinyl acetate copolymers usable particularly advantageously and the preparation thereof are described in WO 99/29748.

Suitable copolymers of class (K1) are also those which comprise two or more different alkenyl carboxylates in copolymerized form, which differ in the alkenyl function and/or in the carboxylic acid group. Likewise suitable are copolymers which, as well as the alkenyl carboxylate(s), comprise at least one olefin and/or at least one (meth)acrylic ester in copolymerized form.

Terpolymers of a $C_2$- to $C_{40}$-α-olefin, a $C_1$- to $C_{20}$-alkyl ester of an ethylenically unsaturated monocarboxylic acid having 3 to 15 carbon atoms and a $C_2$- to $C_{14}$-alkenyl ester of a saturated monocarboxylic acid having 2 to 21 carbon atoms are also suitable as copolymers of class (K1). Terpolymers of this kind are described in WO 2005/054314. A typical terpolymer of this kind is formed from ethylene, 2-ethylhexyl acrylate and vinyl acetate.

The at least one or the further ethylenically unsaturated monomer(s) are copolymerized in the copolymers of class (K1) in an amount of preferably 1 to 50% by weight, especially 10 to 45% by weight and in particular 20 to 40% by weight, based on the overall copolymer. The main proportion in terms of weight of the monomer units in the copolymers of class (K1) therefore originates generally from the $C_2$- to $C_{40}$ base olefins.

The copolymers of class (K1) preferably have a number-average molecular weight $M_n$ of 1000 to 20 000, more preferably of 1000 to 10 000 and especially of 1000 to 8000.

Typical comb polymers of component (K2) are, for example, obtainable by the copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further suitable comb polymers are copolymers of α-olefins and esterified comonomers, for example esterified copolymers of styrene and maleic anhydride or esterified copolymers of styrene and fumaric acid. Suitable comb polymers may also be polyfumarates or polymaleates. Homo- and copolymers of vinyl ethers are also suitable comb polymers. Comb polymers suitable as components of class (K2) are, for example, also those described in WO 2004/035715 and in "Comb-Like Polymers, Structure and Properties", N. A. Platé and V. P. Shibaev, J. Poly. Sci. Macromolecular Revs. 8, pages 117 to 253 (1974). Mixtures of comb polymers are also suitable.

Polyoxyalkylenes suitable as components of class (K3) are, for example, polyoxyalkylene esters, polyoxyalkylene ethers, mixed polyoxyalkylene ester/ethers and mixtures thereof. These polyoxyalkylene compounds preferably comprise at least one linear alkyl group, preferably at least two linear alkyl groups, each having 10 to 30 carbon atoms and a polyoxyalkylene group having a number-average molecular weight of up to 5000. Such polyoxyalkylene compounds are described, for example, in EP A 061 895 and also in U.S. Pat. No. 4,491,455. Particular polyoxyalkylene compounds are based on polyethylene glycols and polypropylene glycols having a number-average molecular weight of 100 to 5000. Additionally suitable are polyoxyalkylene mono- and diesters of fatty acids having 10 to 30 carbon atoms, such as stearic acid or behenic acid.

Polar nitrogen compounds suitable as components of class (K4) may be either ionic or nonionic and preferably have at least one substituent, especially at least two substituents, in the form of a tertiary nitrogen atom of the general formula $>NR^7$ in which $R^7$ is a $C_8$- to $C_{40}$-hydrocarbyl radical. The nitrogen substituents may also be quaternized, i.e. be in cationic form. An example of such nitrogen compounds is that of ammonium salts and/or amides which are obtainable by the reaction of at least one amine substituted by at least one hydrocarbyl radical with a carboxylic acid having 1 to 4 carboxyl groups or with a suitable derivative thereof. The amines preferably comprise at least one linear $C_8$- to $C_{40}$-alkyl radical. Primary amines suitable for preparing the polar nitrogen compounds mentioned are, for example, octylamine, nonylamine, decylamine, undecylamine, dodecylamine, tetradecylamine and the higher linear homologs; secondary amines suitable for this purpose are, for example, dioctadecylamine and methylbehenylamine. Also suitable for this purpose are amine mixtures, especially amine mixtures obtainable on the industrial scale, such as fatty amines or hydrogenated tallamines, as described, for example, in Ullmann's Encyclopedia of Industrial Chemistry, 6th Edition, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid, and succinic acids substituted by long-chain hydrocarbyl radicals.

More particularly, the component of class (K4) is an oil-soluble reaction product of poly($C_2$- to $C_{20}$-carboxylic acids) having at least one tertiary amino group with primary or secondary amines. The poly($C_2$- to —$C_{20}$-carboxylic acids) which have at least one tertiary amino group and form the basis of this reaction product comprise preferably at least 3 carboxyl groups, especially 3 to 12 and in particular 3 to 5 carboxyl groups. The carboxylic acid units in the polycarboxylic acids have preferably 2 to 10 carbon atoms, and are especially acetic acid units. The carboxylic acid units are suitably bonded to the polycarboxylic acids, usually via one or more carbon and/or nitrogen atoms. They are preferably attached to tertiary nitrogen atoms which, in the case of a plurality of nitrogen atoms, are bonded via hydrocarbon chains.

The component of class (K4) is preferably an oil-soluble reaction product based on poly($C_2$- to $C_{20}$-carboxylic acids) which have at least one tertiary amino group and are of the general formula IIa or IIb

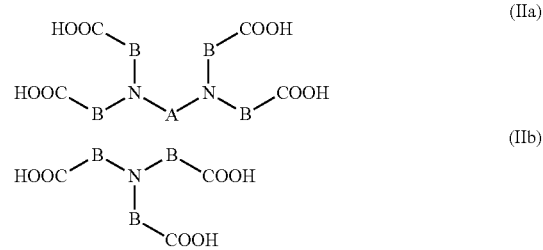

in which the variable A is a straight-chain or branched $C_2$- to $C_6$-alkylene group or the moiety of the formula III

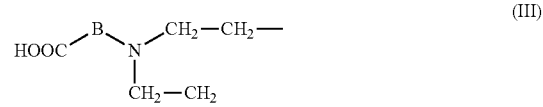

and the variable B is a $C_1$- to $C_{19}$-alkylene group. The compounds of the general formulae IIa and IIb especially have the properties of a WASA.

Moreover, the preferred oil-soluble reaction product of component (K4), especially that of the general formula IIa or IIb, is an amide, an amide-ammonium salt or an ammonium salt in which no, one or more carboxylic acid groups have been converted to amide groups.

Straight-chain or branched $C_2$- to $C_6$-alkylene groups of the variable A are, for example, 1,1-ethylene, 1,2-propylene, 1,3-propylene, 1,2-butylene, 1,3-butylene, 1,4-butylene, 2-methyl-1,3-propylene, 1,5-pentylene, 2-methyl-1,4-butylene, 2,2-dimethyl-1,3-propylene, 1,6-hexylene (hexamethylene) and especially 1,2-ethylene. The variable A comprises preferably 2 to 4 and especially 2 or 3 carbon atoms.

$C_1$- to $C_{19}$-alkylene groups of the variable B are, for example, 1,2-ethylene, 1,3-propylene, 1,4-butylene, hexamethylene, octamethylene, decamethylene, dodecamethylene, tetradecamethylene, hexadecamethylene, octadecamethylene, nonadecamethylene and especially methylene. The variable B comprises preferably 1 to 10 and especially 1 to 4 carbon atoms.

The primary and secondary amines as a reaction partner for the polycarboxylic acids to form component (K4) are typically monoamines, especially aliphatic monoamines. These primary and secondary amines may be selected from a multitude of amines which bear hydrocarbyl radicals which may optionally be bonded to one another.

These parent amines of the oil-soluble reaction products of component (K4) are usually secondary amines and have the general formula $HN(R^8)_2$ in which the two variables $R^8$ are each independently straight-chain or branched $C_{10}$- to $C_{30}$-alkyl radicals, especially $C_{14}$- to $C_{24}$-alkyl radicals. These relatively long-chain alkyl radicals are preferably straight-chain or only slightly branched. In general, the secondary amines mentioned, with regard to their relatively long-chain alkyl radicals, derive from naturally occurring fatty acids and from derivatives thereof. The two $R^8$ radicals are preferably identical.

The secondary amines mentioned may be bonded to the polycarboxylic acids by means of amide structures or in the form of the ammonium salts; it is also possible for only a portion to be present as amide structures and another portion as ammonium salts. Preferably only few, if any, free acid groups are present. The oil-soluble reaction products of component (K4) are preferably present completely in the form of the amide structures.

Typical examples of such components (K4) are reaction products of nitrilotriacetic acid, of ethylenediaminetetraacetic acid or of propylene-1,2-diaminetetraacetic acid with in each case 0.5 to 1.5 mol per carboxyl group, especially 0.8 to 1.2 mol per carboxyl group, of dioleylamine, dipalmitamine, dicocoamine, distearylamine, dibehenylamine or especially ditallamine. A particularly preferred component (K4) is the reaction product of 1 mol of ethylenediaminetetraacetic acid and 4 mol of hydrogenated ditallamine.

Further typical examples of component (K4) include the N,N-dialkylammonium salts of 2-N',N'-dialkylamidobenzoates, for example the reaction product of 1 mol of phthalic anhydride and 2 mol of ditallamine, the latter being hydrogenated or unhydrogenated, and the reaction product of 1 mol of an alkenylspirobislactone with 2 mol of a dialkylamine, for example ditallamine and/or tallamine, the latter two being hydrogenated or unhydrogenated.

Further typical structure types for the component of class (K4) are cyclic compounds with tertiary amino groups or condensates of long-chain primary or secondary amines with carboxylic acid-containing polymers, as described in WO 93/18115.

Sulfocarboxylic acids, sulfonic acids or derivatives thereof which are suitable as cold flow improvers of the component of class (K5) are, for example, the oil-soluble carboxamides and carboxylic esters of ortho-sulfobenzoic acid, in which the sulfonic acid function is present as a sulfonate with alkyl-substituted ammonium cations, as described in EP-A 261 957.

Poly(meth)acrylic esters suitable as cold flow improvers of the component of class (K6) are either homo- or copolymers of acrylic and methacrylic esters. Preference is given to copolymers of at least two different (meth)acrylic esters which differ with regard to the esterified alcohol. The copolymer optionally comprises another different olefinically unsaturated monomer in copolymerized form. The weight-average molecular weight of the polymer is preferably 50 000 to 500 000. A particularly preferred polymer is a copolymer of methacrylic acid and methacrylic esters of saturated $C_{14}$- and $C_{15}$-alcohols, the acid groups having been neutralized with hydrogenated tallamine. Suitable poly (meth)acrylic esters are described, for example, in WO 00/44857.

The cold flow improver or the mixture of different cold flow improvers is added to the middle distillate fuel or diesel fuel in a total amount of preferably 10 to 5000 ppm by weight, more preferably of 20 to 2000 ppm by weight, even more preferably of 50 to 1000 ppm by weight and especially of 100 to 700 ppm by weight, for example of 200 to 500 ppm by weight.

B4) Lubricity Improvers

Suitable lubricity improvers or friction modifiers are based typically on fatty acids or fatty acid esters. Typical examples are tall oil fatty acid, as described, for example, in WO 98/004656, and glyceryl monooleate. The reaction products, described in U.S. Pat. No. 6,743,266 B2, of natural or synthetic oils, for example triglycerides, and alkanolamines are also suitable as such lubricity improvers.

B5) Corrosion Inhibitors

Suitable corrosion inhibitors are, for example, succinic esters, in particular with polyols, fatty acid derivatives, for example oleic esters, oligomerized fatty acids, substituted ethanolamines, and products sold under the trade name RC 4801 (Rhein Chemie Mannheim, Germany) or HiTEC 536 (Ethyl Corporation).

B6) Demulsifiers

Suitable demulsifiers are, for example, the alkali metal or alkaline earth metal salts of alkyl-substituted phenol- and naphthalenesulfonates and the alkali metal or alkaline earth metal salts of fatty acids, and also neutral compounds such as alcohol alkoxylates, e.g. alcohol ethoxylates, phenol alkoxylates, e.g. tert-butylphenol ethoxylate or tert-pentylphenol ethoxylate, fatty acids, alkylphenols, condensation products of ethylene oxide (EO) and propylene oxide (PO), for example including in the form of EO/PO block copolymers, polyethyleneimines or else polysiloxanes.

B7) Dehazers

Suitable dehazers are, for example, alkoxylated phenolformaldehyde condensates, for example the products available under the trade names NALCO 7D07 (Nalco) and TOLAD 2683 (Petrolite).

B8) Antifoams

Suitable antifoams are, for example, polyether-modified polysiloxanes, for example the products available under the trade names TEGOPREN 5851 (Goldschmidt), Q 25907 (Dow Corning) and RHODOSIL (Rhone Poulenc).

B9) Cetane Number Improvers

Suitable cetane number improvers are, for example, aliphatic nitrates such as 2-ethylhexyl nitrate and cyclohexyl nitrate and peroxides such as di-tert-butyl peroxide.

B10) Antioxidants

Suitable antioxidants are, for example substituted phenols, such as 2,6-di-tert-butylphenol and 6-di-tert-butyl-3-methylphenol, and also phenylenediamines such as N,N'-di-sec-butyl-p-phenylenediamine.

B11) Metal Deactivators

Suitable metal deactivators are, for example, salicylic acid derivatives such as N,N'-disalicylidene-1,2-propanediamine.

B12) Solvents

Suitable solvents are, for example, nonpolar organic solvents such as aromatic and aliphatic hydrocarbons, for example toluene, xylenes, white spirit and products sold under the trade names SHELLSOL (Royal Dutch/Shell Group) and EXXSOL (ExxonMobil), and also polar organic solvents, for example, alcohols such as 2-ethylhexanol, decanol and isotridecanol. Such solvents are usually added to the diesel fuel together with the aforementioned additives and coadditives, which they are intended to dissolve or dilute for better handling.

C) Fuels

The inventive additive is outstandingly suitable as a fuel additive and can be used in principle in any fuels. It brings about a whole series of advantageous effects in the operation of internal combustion engines with fuels. Preference is given to using the inventive quaternized additive in middle distillate fuels, especially diesel fuels.

The present invention therefore also provides fuels, especially middle distillate fuels, with a content of the inventive quaternized additive which is effective as an additive for achieving advantageous effects in the operation of internal combustion engines, for example of diesel engines, especially of direct injection diesel engines, in particular of diesel engines with common rail injection systems. This effective content (dosage rate) is generally 10 to 5000 ppm by weight, preferably 20 to 1500 ppm by weight, especially to 1000 ppm by weight, in particular 30 to 750 ppm by weight, based in each case on the total amount of fuel.

Middle distillate fuels such as diesel fuels or heating oils are preferably mineral oil raffinates which typically have a boiling range from 100 to 400° C. These are usually distillates having a 95% point up to 360° C. or even higher. These may also be what is called "ultra low sulfur diesel" or "city diesel", characterized by a 95% point of, for example, not more than 345° C. and a sulfur content of not more than 0.005% by weight or by a 95% point of, for example, 285° C. and a sulfur content of not more than 0.001% by weight. In addition to the mineral middle distillate fuels or diesel fuels obtainable by refining, those obtainable by coal gasification or gas liquefaction ["gas to liquid" (GTL) fuels] or by biomass liquefaction ["biomass to liquid" (BTL) fuels] are also suitable. Also suitable are mixtures of the aforementioned middle distillate fuels or diesel fuels with renewable fuels, such as biodiesel or bioethanol.

The qualities of the heating oils and diesel fuels are laid down in detail, for example, in DIN 51603 and EN 590 (cf. also Ullmann's Encyclopedia of Industrial Chemistry, 5th edition, Volume A12, p. 617 ff.).

In addition to the use thereof in the abovementioned middle distillate fuels of fossil, vegetable or animal origin, which are essentially hydrocarbon mixtures, the inventive quaternized additive can also be used in mixtures of such middle distillates with biofuel oils (biodiesel). Such mixtures are also encompassed by the term "middle distillate fuel" in the context of the present invention. They are commercially available and usually comprise the biofuel oils in minor amounts, typically in amounts of 1 to 30% by weight, especially of 3 to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are typically understood to mean lower alkyl esters, especially $C_1$- to $C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters based on vegetable and/or animal oils and/or fats, which find use as a biofuel oil or components thereof, are, for example, sunflower methyl ester, palm oil methyl ester ("PME"), soya oil methyl ester ("SME") and especially rapeseed oil methyl ester ("RME").

The middle distillate fuels or diesel fuels are more preferably those having a low sulfur content, i.e. having a sulfur content of less than 0.05% by weight, preferably of less than 0.02% by weight, more particularly of less than 0.005% by weight and especially of less than 0.001% by weight of sulfur.

Useful gasoline fuels include all commercial gasoline fuel compositions. One typical representative which shall be mentioned here is the Eurosuper base fuel to EN 228, which is customary on the market. In addition, gasoline fuel compositions of the specification according to WO 00/47698 are also possible fields of use for the present invention.

The inventive quaternized additive is especially suitable as a fuel additive in fuel compositions, especially in diesel fuels, for overcoming the problems outlined at the outset in direct injection diesel engines, in particular in those with common rail injection systems.

The invention is now illustrated in detail by the working examples which follow. More particularly, the test methods specified hereinafter are part of the general disclosure of the application and are not restricted to the specific working examples.

EXPERIMENTAL

A. General Test Methods

1. DW10 Test—Determination of Power Loss as a Result of Injector Deposits in the Common Rail Diesel Engine The tests are based on CEC test procedure F-098-08 Issue 5. This is done using the same test setup and engine type (PEUGEOT DW10) as in the CEC procedure.

The alteration and special features are described in the use examples which follow.

2. IDID Test—Determination of Additive Effect on Internal Injector Deposits

The formation of deposits within the injector was characterized by the deviations in the exhaust gas temperatures of the cylinders at the cylinder outlet on cold starting of the DW10 engine.

To promote the formation of deposits, 1 mg/l of sodium salt of an organic acid, 20 mg/l of dodecenylsuccinic acid and 10 mg/l of water were added to the fuel.

The dodecenylsuccinic acid used was obtained by hydrolysis of dodecenylsuccinic anhydride, isomer mixture from Aldrich, CAS No. 26544-38-7.

The test is conducted as a dirty-up clean-up test (DU-CU).

DU-CU is based on CEC test procedure F-098-08 Issue 5.

The DU-CU test consists of two individual tests which are run in succession. The first test serves to form deposits (DU), the second to remove the deposits (CU).

After the DU run, after a rest phase of at least eight hours, a cold start of the engine is conducted, followed by idling for 10 minutes.

Thereafter, the CU fuel is used to start the CU without deinstalling and cleaning the injectors. After the CU run over 8 h, after a rest phase of at least eight hours, a cold start of the engine is conducted, followed by idling for 10 minutes. The evaluation is effected by the comparison of the temperature profiles for the individual cylinders after the cold start in the DU and CU runs.

The IDID test indicates the formation of internal deposits in the injector. The characteristic used in this test is the exhaust gas temperature of the individual cylinders. In an injector system without IDIDs, the exhaust gas temperatures of the cylinders increase homogeneously. In the presence of IDIDs, the exhaust gas temperatures of the individual cylinders do not increase homogeneously and deviate from one another.

The temperature sensors are beyond the cylinder head outlet in the exhaust gas manifold. Significant deviation of the individual cylinder temperatures (e.g. >20° C.) indicates the presence of internal injector deposits (IDIDs).

The tests (DU and CU) are each conducted with run time 8 h. The one-hour test cycle from CEC F-098-08 (see FIGS. 1A and 1B) is run through 8 times in each case. In the event of deviations of the individual cylinder temperatures of greater than 45° C. from the mean for all 4 cylinders, the test is stopped early.

Alteration and special features: Cleaned injectors were installed before the start of each DU test run. The cleaning time in the ultrasound bath at 60° C., in water+10% Superdecontamine, was 4 h.

B. Synthesis Examples

Synthesis Example 1

(MA/C20-$C_{24}$, in Wibarcan®)

A 4 L glass reactor with anchor stirrer was initially charged with a mixture of $C_{20}$-$C_{24}$ olefins (901.4 g, average molar mass 296 g/mol) and Wibarcan® (1113.0 g, from Wibarco). The mixture was heated to 150° C. in a nitrogen stream and while stirring. To this were added, within 5 h, a solution of di-tert-butyl peroxide (12.2 g, from Akzo Nobel) in Wibarcan® (107.7 g) and molten maleic anhydride (298.6 g). The reaction mixture was stirred at 150° C. for 1 h and then cooled to 95° C. At this temperature, water (43.4 g) was added within 3 h and then stirring was continued for 11 h.

GPC (eluent: THF+1% trifluoroacetic acid, polystyrene standard) showed a polymer with Mn=619 g/mol, Mw=2780 g/mol, polydispersity 4.5.

Synthesis Example 2

(MA/C20-$C_{24}$, in Solvesso™ 150)

A 2 L glass reactor with anchor stirrer was initially charged with a mixture of $C_{20}$-$C_{24}$ olefins (363.2 g, average molar mass 296 g/mol) and Solvesso™ 150 (270.2 g, DHC Solvent Chemie GmbH). The mixture was heated to 150° C. in a nitrogen stream and while stirring. To this were added, within 5 h, a solution of di-tert-butyl peroxide (24.67 g, from Akzo Nobel) in Solvesso™ 150 (217.0 g) and molten maleic anhydride (120.3 g). The reaction mixture was stirred at 150° C. for 1 h and then cooled to 95° C. At this temperature, water (19.9 g) was added within 3 h and then stirring was continued for a further 11 h.

GPC (eluent: THF+1% trifluoroacetic acid, polystyrene standard) showed a polymer with Mn=1330 g/mol, Mw=2700 g/mol, polydispersity 2.0.

Synthesis Example 3

(MA/C20-$C_{24}$, in Solvesso™ 150)

A 2 L glass reactor with anchor stirrer was initially charged with a mixture of $C_{20}$-$C_{24}$ olefins (363.2 g, average molar mass 296 g/mol) and Solvesso™ 150 (231.5 g, DHC Solvent Chemie GmbH). The mixture was heated to 160° C. in a nitrogen stream and while stirring. To this were added, within 5 h, a solution of di-tert-butyl peroxide (29.6 g, from Akzo Nobel) in Solvesso™ 150 (260.5 g) and molten maleic anhydride (120.3 g). The reaction mixture was stirred at 150° C. for 1 h and then cooled to 95° C. At this temperature, water (19.9 g) was added within 3 h and then stirring was continued for a further 11 h.

GPC (eluent: THF+1% trifluoroacetic acid, polystyrene standard) showed a polymer with Mn=1210 g/mol, Mw=2330 g/mol, polydispersity 1.9.

Synthesis Example 4

(MA/C20-$C_{24}$, in Solvesso™ 150)

A 2 L glass reactor with anchor stirrer was initially charged with a mixture of $C_{20}$-$C_{24}$ olefins (371.8 g, average molar mass 296 g/mol) and Solvesso™ 150 (420.7 g, DHC Solvent Chemie GmbH). The mixture was heated to 150° C. in a nitrogen stream and while stirring. To this were added, within 3 h, a solution of di-tert-butyl peroxide (5.71 g, from Akzo Nobel) in Solvesso™ 150 (50.2 g) and molten maleic anhydride (123.2 g). The reaction mixture was stirred at 150° C. for 1 h and then cooled to room temperature. A 250 mL two-neck flask with attached reflux condenser was initially charged with 160 g of the copolymer thus obtained and 3.63 g of water. The mixture was stirred at 95° C. for 16 h.

Synthesis Example 5

Quaternization

A 2 L autoclave is initially charged with a solution of the reaction product from synthesis example 2 (234 g, solution in Solvesso™ 150) and cocoyldimethylamine (112.6 g, N,N-dimethyl-N—$C_{12/14}$-amine, CAS 68439-70-3 or CAS 112-18-5 with a total amine value of 249 mg KOH/g) in 2-propylheptanol (259 g). This is followed by purging three times with $N_2$, establishment of a supply pressure of approx. 2 bar of $N_2$ and an increase in the temperature to 50° C. Propylene oxide (58 g) is metered in within 1 h. This is followed by stirring at 50° C. for 15 h, cooling to 25° C., purging with $N_2$ and emptying of the reactor. The product is transferred into a 2 L jacketed reactor and excess propylene oxide is removed by introducing an $N_2$ stream (10 l/h) under reduced pressure (100 mbar) at 50° C. for 6 h. $^1$H NMR ($CDCl_3$) confirms the quaternization (δ=3.3 ppm, singlet, $R_2N(CH_3)_2$).

D. Use Examples

Use Example 1: DW10 Zn Engine Test (Clean-Up)

The test was conducted with a Peugeot DW10 engine, which is used according to the standard CEC F-98-08 procedure, except that more severe conditions were used in the dirty-up part:

I. Dirty-Up:

The more severe conditions allow much quicker formation of injector deposits and hence a quicker power loss determination than under standard CEC F-98-08 conditions: The engine was operated at full load (4000 rpm) with EN590 B7 Aral, unadditized, containing 3 mg/kg Zn, for 4.28 h. The results are compiled in the following table:

II. Clean-Up:

For the clean-up test, shortened to 8 h as per the CEC F-98-08 procedure, with 1 ppm of Zn and EN590 B7 Aral fuel, unadditized, comprising inventive additives, the results compiled in the following table were achieved.

| Test | Additives | Engine power before test kW | Engine power after test kW | Change in power in test % |
|---|---|---|---|---|
| Dirty-up (quick method), full load | 3 ppm Zn | 98.3 | 94.5 | −3.9 |
| Clean-up, 8 h, CEC F-98-08 procedure | 1 ppm Zn and 28 ppm active constituent, synthesis example 4 | 94.1 | 96.4 | +2.4 |
| Dirty-up (quick method), full load | 3 ppm Zn | 95.8 | 90.5 | −5.5 |
| Clean-up, 8 h, CEC F-98-08 procedure | 1 ppm Zn and 50 ppm active constituent, synthesis example 2 | 90.5 | 94.1 | +4.0 |
| Dirty-up (quick method), full load | 3 ppm Zn | 95.4 | 91.5 | −4.1 |
| Clean-up, 8 h, CEC F-98-08 procedure | 1 ppm Zn and 70 ppm active constituent, synthesis example 5 | 91.2 | 94.3 | +3.2 |

The compounds described in this invention are effective against the formation of deposits in direct injection engines, such as Peugeot DW10, under testing as per CEC F-98-08, and are capable of earlier removal of the deposits formed.

Use Example 2: DW10 Na Soap IDID Test (Clean-Up)

To examine the influence of the additives on the performance of direct injection diesel engines, a further test method used was the IDID engine test, in which the exhaust gas temperatures in the cylinders at the cylinder outlet were determined on cold starting of the DW10 engine. A direct injection diesel engine with common rail system from the manufacturer Peugeot as per test method CEC F-098-08 was used. The fuel used was a commercial B7 diesel fuel according to EN 590 from Aral. To artificially induce the formation of deposits, 1 ppm by weight of sodium naphthenate and 20 ppm by weight of dodecenylsuccinic acid were added in each case.

Similarly to the CEC F-98-08 method, the engine power is measured during the test. The test consisted of two parts:

I. Dirty-Up:

The test was conducted without addition of compounds according to this invention. The test was shortened to 8 hours; the CEC F-98-08 method was conducted without addition of Zn. If significant deviations in exhaust gas temperatures were observed, the test was stopped before the 8-hour mark was reached, in order to avoid engine damage. After the dirty-up run, the engine was left to cool and then restarted and operated in idling mode for 5 minutes. During these 5 minutes, the engine was warmed up. The exhaust gas temperature of each cylinder was recorded. The smaller the differences between the exhaust gas temperatures found, the smaller the amount of IDIDs formed.

The exhaust gas temperatures of the 4 cylinders ("C1" to "C4") were measured at each of the cylinder outlets after 0 minutes ("θ0") and after 5 minutes ("θ5"). The results of the exhaust gas temperature measurements with average values ("Δ") and the greatest differences from Δ in the downward ("−") and upward ("+") directions for the two test runs are summarized in the overview which follows.

II. Clean-Up:

The test was shortened to 8 hours; the CEC F-98-08 method was conducted without addition of Zn. However, 1 ppm by weight of sodium naphthenate and 20 ppm by weight of dodecenylsuccinic acid, and also an inventive compound, were added in each case, and the engine power was determined.

After the clean-up, the engine was cooled and restarted. The exhaust gas temperature of each cylinder was recorded. The smaller the differences between the exhaust gas temperatures found, the smaller the amount of IDIDs formed.

The exhaust gas temperatures of the 4 cylinders ("C1" to "C4") were measured at each of the cylinder outlets after 0 minutes ("θ0") and after 5 minutes ("θ5"). The results of the exhaust gas temperature measurements with average values ("Δ") and the greatest differences from Δ in the downward ("−") and upward ("+") directions are summarized in the overview which follows.

The following results were found:

Dirty-Up Clean-Up Sequence 1:

Dirty-Up:

Significant deviations in exhaust gas temperatures were found during the test, and so it was stopped after 3 hours, in order to avoid engine damage.

After Dirty-Up:

| | | | | |
|---|---|---|---|---|
| θ0 | C1: 34° C. | C2: 31° C. | C3: 28° C. | C4: 27° C. |
| θ5 | C1: 119° C. | C2: 117° C. | C3: 41° C. | C4: 45° C. |
| Δ: 80.5° C. | (+38.5° C./−39.5° C.) | | | |

Significant deviations from the mean and significant differences between the individual cylinders show the presence of IDIDs.

Clean-Up:

After clean-up with 168 ppm of additive according to synthesis example 4 in the presence of 1 ppm of Na+20 ppm of dodecenylsuccinic acid:

| | | | | |
|---|---|---|---|---|
| θ0 | C1: 28° C. | C2: 27° C. | C3: 27° C. | C4: 26° C. |
| θ5 | C1: 74° C. | C2: 77° C. | C3: 60° C. | C4: 66° C. |
| Δ: 69.3° C. | (−9.3° C./+7.7° C.) | | | |

The deviation from the mean temperature of the exhaust gases is low, which suggests the removal of IDIDs.

Dirty-Up Clean-Up Sequence 2:

After Dirty-Up (8 h):

| | | | | |
|---|---|---|---|---|
| θ0 | C1: 40° C. | C2: 28° C. | C3: 38° C. | C4: 30° C. |
| θ5 | C1: 274° C. | C2: 293° C. | C3: 112° C. | C4: 57° C. |
| Δ: 184° C. | (+109° C./−127° C.) | | | |

Extremely high deviations from the mean and significant differences between the individual cylinders show the presence of significant IDIDs.

Clean-Up

After clean-up with 140 ppm of additive according to synthesis example 4 in the presence of 1 ppm of Na+20 ppm of dodecenylsuccinic acid:

| | | | | |
|---|---|---|---|---|
| θ0 | C1: 44° C. | C2: 43° C. | C3: 44° C. | C4: 45° C. |
| θ5 | C1: 78° C. | C2: 78° C. | C3: 83° C. | C4: 80° C. |
| Δ: 80° C. | (−2° C./+3° C.) | | | |

The deviation from the mean temperature of the exhaust gases is very low, which suggests the removal of the significant IDIDs.

The compounds according to this invention are thus very effective against IDID formation in engines with direct injection, such as Peugeot DW10, in a test similar to the CEC F-98-08 procedure.

Use Example 3: DW10 Na Power Loss Test

To examine the efficacy of the inventive compounds against power loss caused by metals such as Na, K and others (and not by Zn as described above), an IDID engine test was used. During the run, the power is measured to CEC F-098-08.

| Test | Additive | Engine power before the test [kW] | Engine power after the test [kW] | Change in power in the test [%] |
|---|---|---|---|---|
| Dirty-up 8 h | 1 ppm Na + 20 ppm dodecenylsuccinic acid | 96.8 | 88.8 | −8.3 |
| Clean-up 8 h | 1 ppm Na + 20 ppm dodecenylsuccinic acid and 140 ppm active constituent, synthesis example 4 | 88.4 | 91.4 | +3.4 |
| Clean-up 8 h | 1 ppm Na + 20 ppm dodecenylsuccinic acid and 100 ppm active constituent, synthesis example 5 | 90.0 | 91.2 | +0.9 |

The compounds according to this invention are effective against deposits caused by metals other than Zn in engines with direct injection, as shown in the above Na power loss test. The compounds effectively prevent power loss and can also be used to remove deposits.

Use Example 4: Filterability Test (IP 387)

The formation of residues in the fuel and injection system originates from inadequate solubility of the residues formed, and the constituents and precursors thereof.

IP 387/97 tests were conducted in order to determine the tendency of the fuel to block a filter, by determining the amount of agglomerate and small insoluble particles in the fuel. In this test, fuel is conveyed through a particular glass filter medium at a constant flow rate of 20 mL/min. The pressure differential across the filter is monitored and the volume of fuel conveyed through the filter before attainment of a particular pressure differential is measured. The test is ended either when 300 mL of fuel have been filtered or the pressure differential exceeds 105 kPa. Any smaller pressure differential after filtration of 300 mL of fuel indicates a minor tendency to block filters.

In the test, a fuel according to EN 590 without performance additives was used as base fuel. In order to study the tendency of the fuel to block the filter through salt formation, the fuel was spiked with 3 mg/L of sodium ions (through addition of sodium naphthenate) and 20 mg/L of dodecenylsuccinic acid.

a) In the IP 387 test, the base fuel spiked with 3 mg/L of sodium and 20 mg/L of dodecenylsuccinic acid gave a pressure differential of 105 kPa at an early stage after filtration of 240 mL of fuel.

b) Addition of 250 mg/kg of the product prepared according to synthesis example 4 to the base fuel in addition to 3 mg/L of sodium and 20 mg/L of dodecenylsuccinic acid, after filtration of 300 mL of fuel, showed a pressure differential of only 26 kPa.

This clearly shows that the inventive example improves the filterability of the fuel and hence can prevent the deposition of residues in the fuel and injector system.

Use Example 5: Test for Determination of the Formation of Deposits in Fuels at Elevated Temperature (JFTOT Test to ASTM D3241)

In the test, a fuel according to EN 590 without performance additives was used as base fuel. The test was conducted according to ASTM D3241 without a preliminary filter. A temperature in the heating tube of 260° C. was established; the fuel flow rate was 3 mL/min; the total duration was 150 min.

The test was ended as soon as the pressure drop exceeded 250 mm Hg. The backpressure at the end of the test or the time before attainment of the pressure drop of 25 mm Hg was used in order to determine the formation rate of deposits. A small pressure drop at the end of the test or a long period before attainment of the value of 25 mm Hg in the test show a minor tendency to form deposits.

a) The base fuel spiked with 3 mg/L of sodium and 20 mg/L of dodecenylsuccinic acid led to a backpressure of 250 mm Hg in the test after 80 min; a backpressure of 25 mm Hg was attained after 12 min.

b) Addition of 500 mg/kg of the product prepared according to synthesis example 4 to the base fuel in addition to 3 mg/L of sodium and 20 mg/L of dodecenylsuccinic acid showed a backpressure of zero at the end of the test after 150 min.

c) Addition of 500 mg/kg of a dodecenylsuccinimide of TEPA, prepared by condensation reaction of dodecenylsuccinic anhydride with tetraethylenepentamine (TEPA) as a 50% by weight solution in 2-ethylhexanol to the base fuel in addition to 3 mg/L of sodium and 20 mg/L of dodecenylsuccinic acid led to a backpressure of 250 mm Hg in the test after only 28 min; a backpressure of 25 mm Hg was attained after only 6 min. In addition, brown deposits were detected in the test apparatus.

d) Addition of 500 mg/kg of the product prepared according to synthesis example 4 to the fuel mixture according to c) led to a backpressure of only 6 mm Hg at the end of the test after 150 min.

This shows clearly that the inventive example can prevent the deposition of residues in the fuel at relatively high temperatures.

Use Example 6: DW10 Polymeric IDID Test (Clean Up)

To study the influence of the additives on the performance of direct injection diesel engines as a further test method the IDID engine test was performed, in which the exhaust gas temperature of the cylinders was determined at the cylinder outlet on cold starting of the DW10 engine. A direct injection diesel engine with a common rail system from the manufacturer Peugeot according to test methods CEC F-098-008 was used.

The fuel used was DF-79-07 BATCH 7 fuel from Haltermann.

To this fuel were added 50 mg/kg of the product of the condensation reaction of dodecenylsuccinic anhydride isomer mixture (CAS Number 26544-38-7) with tetraethylenepentamine (TEPA) (CAS Number 112-57-2), which was obtained as follows:

To a solution of dodecenylsuccinic anhydride isomer mixture (1.0 eq., by hydrolysis number) in Solvent Naphtha Naphthalene depleted was added dropwise, at 100° C., tetraethylenepentamine (1.0 eq, M=189.3 g/mol). Subsequently, the mixture was heated to 170° C. and water which formed was distilled off. Thereafter, 2-ethylhexanol was added, and the mixture was cooled and discharged.

The amount of solvents was chosen such that the product had a concentration of 50% (w/w) in a Solvent Naphtha Naphthalene depleted/2-ethylhexanol 4:1 (w/w) solvent mixture.

I. Dirty-Up

The test was conducted without addition of compounds according to this invention and was shortened to 8 hours; the CEC F-98-08 method was conducted without addition of zinc.

After the dirty up run, the engine was cooled down and restarted and run in idling operation for 5 minutes. During these 5 minutes, the engine was warmed up. The exhaust gas temperature from each cylinder was recorded. The smaller the differences between the exhaust gas temperatures found, the smaller the amount of IDIDs formed.

The exhaust gas temperatures of each of the 4 cylinders ("Z1" to "Z4") at the cylinder outlets was measured after 0 minutes ("θ 0") and after 5 minutes ("θ 5"). The results of the exhaust gas temperature measurements with average values ("Δ") and the greatest downward ("−") and upward ("+") deviations of Δ are summarized in the overview which follows.

II. Clean-Up

The test was shortened to 8 hours; the CEC F-98-08 method was conducted without addition of zinc.

50 mg/kg of the product of the condensation reaction of dodecenylsuccinic anhydride with tetraethylenepentamine (TEPA) (prepared as described in use example 6) was added to artificially induce the formation of deposits.

Also added to the fuel mixture were 100 mg/kg of the product prepared according to synthesis example 4.

The following results were found:
After Dirty Up

| θ0 | Z1: 45° C. | Z2: 47° C. | Z3: 33° C. | Z4: 45° C. |
|---|---|---|---|---|
| θ5 | Z1: 82° C. | Z2: 104° C. | Z3: 47° C. | Z4: 113° C. |
| Δ: 86.5° C. | (−39.5° C./+26.5° C.) | | | |

Significant deviations from the mean and significant differences between the individual cylinders demonstrate the presence of IDIDs.
After Clean Up

| θ0 | Z1: 41° C. | Z2: 41° C. | Z3: 39° C. | Z4: 43° C. |
|---|---|---|---|---|
| θ5 | Z1: 82° C. | Z2: 81° C. | Z3: 80° C. | Z4: 82° C. |
| Δ: 81.3° C. | (−1.3° C./+0.7° C.) | | | |

The deviation from the mean temperature of the exhaust gases is small, which suggests the removal of IDIDs.

The test result after clean up shows that the compounds according to the invention are very effective in preventing the formation of and removing polymeric IDIDs.

The disclosure of the publications cited herein is explicitly incorporated by reference.

The invention claimed is:

1. A method, comprising operating a direct injection diesel engine with a fuel comprising an additive, wherein the presence of the additive reduces and/or prevents of internal diesel injector deposits (IDID),
    wherein the additive comprises:
        a copolymer comprising units of an olefin and units of an olefin-polymerizable carboxylic acid, wherein the copolymer comprises at least one free carboxylic acid side group,
    wherein
        the olefin-polymerizable carboxylic acid is a polymerizable mono- or polycarboxylic acid,
        the additive is present in an effective content range of 25 to 1000 ppm by weight based on a total amount of the fuel,
        the deposits in the fuel system are reduced and/or prevented as a result of injecting the fuel comprising the additive, and
        the additive does not comprise quaternized nitrogen compounds.

2. The method according to claim 1, wherein the copolymer is obtained by a method comprising:
    (1) copolymerizing
        a) at least one ethylenically unsaturated, polymerizable polycarboxylic anhydride with
        b) at least one polymerizable olefin;
    (2) then derivatizing the copolymer from (1) by partial or complete reaction of the anhydride radicals of the copolymer from said (1) copolymerizing with water, or at least one hydroxyl compound, or at least one primary or secondary amine, or mixtures thereof; to form a copolymer derivative containing carboxyl groups.

3. The method according to claim 1, wherein the copolymer is obtained by a method comprising:
    (1) copolymerizing
        a) at least one ethylenically unsaturated, polymerizable mono- or polycarboxylic acid with
        b) at least one polymerizable olefin;
    (2) then derivatizing the copolymer from (1) by partial reaction of the carboxyl radicals of the copolymer with at least one hydroxyl compound, at least one primary or secondary amine; or mixtures thereof, to form a copolymer derivative having a reduced content of free carboxyl groups.

4. The method according to claim 1, wherein the copolymer is obtained by a method comprising:
    copolymerizing
        a) at least one ethylenically unsaturated, polymerizable mono- or polycarboxylic acid with
        b) at least one polymerizable olefin to form a hydrolysis product.

5. The method according to claim 1, wherein the olefin-polymerizable carboxylic acid is an ethylenically unsaturated polycarboxylic anhydride.

6. The method according to claim 1, wherein the olefin comprises at least one of:
    a $C_4$-$C_{40}$-α-olefin; and
    a polymer formed from $C_2$-$C_{40}$-α-olefin units having at least one polymerizable double bond and having an Mw in the range from 56 to 10 000.

7. The method according to claim 1, wherein the olefin-polymerizable carboxylic acid is an ethylenically unsaturated $C_3$-$C_{40}$-monocarboxylic acid.

8. The method according to claim 1, wherein the polymer is hydrolyzed to at least 95 mol %.

9. The method according to claim 1, wherein a molar ratio of the olefin monomer(s) to the olefin-polymerizable carboxylic acid monomer(s) is from 0.5:0.5 to 0.7:0.3.

10. The method according to claim 1, wherein the presence of the additive reduces and/or prevents within the diesel injector deposits at the nozzle needle, the control piston, the valve piston, the valve seat, the control unit and/or the guides of these components.

11. The method according to claim 1, wherein the presence of the additive reduces and/or prevents IDID caused by sodium, calcium and/or potassium.

12. The method according to claim 1, wherein the presence of the additive reduces and/or prevents IDID caused by polymers.

13. The method according to claim 1, wherein the presence of the additive causes homogenous increase of the exhaust gas temperature of the cylinders of the engine.

* * * * *